US012128909B1

(12) United States Patent
Nag et al.

(10) Patent No.: US 12,128,909 B1
(45) Date of Patent: Oct. 29, 2024

(54) METHODS AND APPARATUS FOR FAILOVER BEHAVIOR OF AUTONOMOUS VEHICLES

(71) Applicant: Nuro, Inc., Mountain View, CA (US)

(72) Inventors: Sreeja Nag, San Bruno, CA (US); Sarah Thornton, Mountain View, CA (US)

(73) Assignee: NURO, INC., Mountain View, CA (US)

( * ) Notice: Subject to any disclaimer, the term of this patent is extended or adjusted under 35 U.S.C. 154(b) by 518 days.

(21) Appl. No.: 17/487,667

(22) Filed: Sep. 28, 2021

Related U.S. Application Data

(60) Provisional application No. 63/085,831, filed on Sep. 30, 2020.

(51) Int. Cl.
B60W 50/02 (2012.01)
B60W 30/09 (2012.01)
(Continued)

(52) U.S. Cl.
CPC ........ B60W 50/0205 (2013.01); B60W 30/09 (2013.01); B60W 30/0953 (2013.01);
(Continued)

(58) Field of Classification Search
CPC ............. B60W 50/0205; B60W 30/09; B60W 30/0953; B60W 30/0956;
(Continued)

(56) References Cited

U.S. PATENT DOCUMENTS

| 8,818,682 B1* | 8/2014 | Dolgov | G05D 1/0055 340/901 |
| 10,671,076 B1* | 6/2020 | Kobilarov | G08G 1/166 |
| 10,766,489 B2* | 9/2020 | Tuncali | B60W 30/165 |
| 2018/0164825 A1* | 6/2018 | Matus | B60W 40/09 |

(Continued)

OTHER PUBLICATIONS

Thorn et al., "A Framework for Automated Driving System Testable Cases and Scenarios," NHTSA, Report No. DOT HS 812 623, Sep. 2018, https://www.nhtsa.gov/sites/nhtsa.gov/files/documents/13882-automateddrivingsystems_092618_v1a_tag.pdf, 180 pages.
(Continued)

Primary Examiner — Peter D Nolan
Assistant Examiner — Anwar Mohamed
(74) Attorney, Agent, or Firm — Edell, Shapiro & Finnan, LLC

(57) ABSTRACT

According to one aspect, methods to select and implement a failover behavior based on situational awareness, when an autonomous vehicle enters a failover condition, are provided. Operation design domains, other users who share a road with the autonomous vehicle, and tailgaters may be considered when determining a deceleration profile, a trajectory length, and a trajectory type for the autonomous vehicle to follow when executing failover behavior. An autonomous driving system of an autonomous vehicle detects a failover event while the autonomous vehicle is traveling along a path and analyzes an environment surrounding the autonomous vehicle to determine whether a tailgater is present behind the autonomous vehicle. The autonomous driving system generates a failover plan for performing a failover behavior based on the failover event and the environment surrounding the autonomous vehicle and engages the autonomous vehicle to implement the failover plan for performing the failover behavior.

20 Claims, 15 Drawing Sheets

(51) Int. Cl.
*B60W 30/095* (2012.01)
*B60W 30/18* (2012.01)
*B60W 40/04* (2006.01)
*B60W 60/00* (2020.01)

(52) U.S. Cl.
CPC .. *B60W 30/0956* (2013.01); *B60W 30/18159* (2020.02); *B60W 40/04* (2013.01); *B60W 50/0225* (2013.01); *B60W 60/0015* (2020.02); *B60W 2554/4029* (2020.02)

(58) Field of Classification Search
CPC ........... B60W 30/18159; B60W 40/04; B60W 50/0225; B60W 60/0015; B60W 2554/4029
See application file for complete search history.

(56) References Cited

U.S. PATENT DOCUMENTS

| | | | |
|---|---|---|---|
| 2019/0009785 A1* | 1/2019 | Lawrenson | G08G 1/017 |
| 2019/0071084 A1* | 3/2019 | Tuncali | B60W 30/165 |
| 2019/0101919 A1* | 4/2019 | Kobilarov | B60W 30/09 |
| 2019/0308617 A1* | 10/2019 | Groult | B60Q 1/543 |
| 2020/0148204 A1* | 5/2020 | Kunz | G05D 1/0088 |
| 2021/0405185 A1* | 12/2021 | Price | G01S 13/46 |

OTHER PUBLICATIONS

Koopman, et al., "Challenges in Autonomous Vehicle Testing and Validation," Preprint: 2016 SAE World Congress, Jan. 2016, http://users.ece.cmu.edu/~koopman/pubs/koopman16_sae_autonomous_validation.pdf, 10 pages.

* cited by examiner

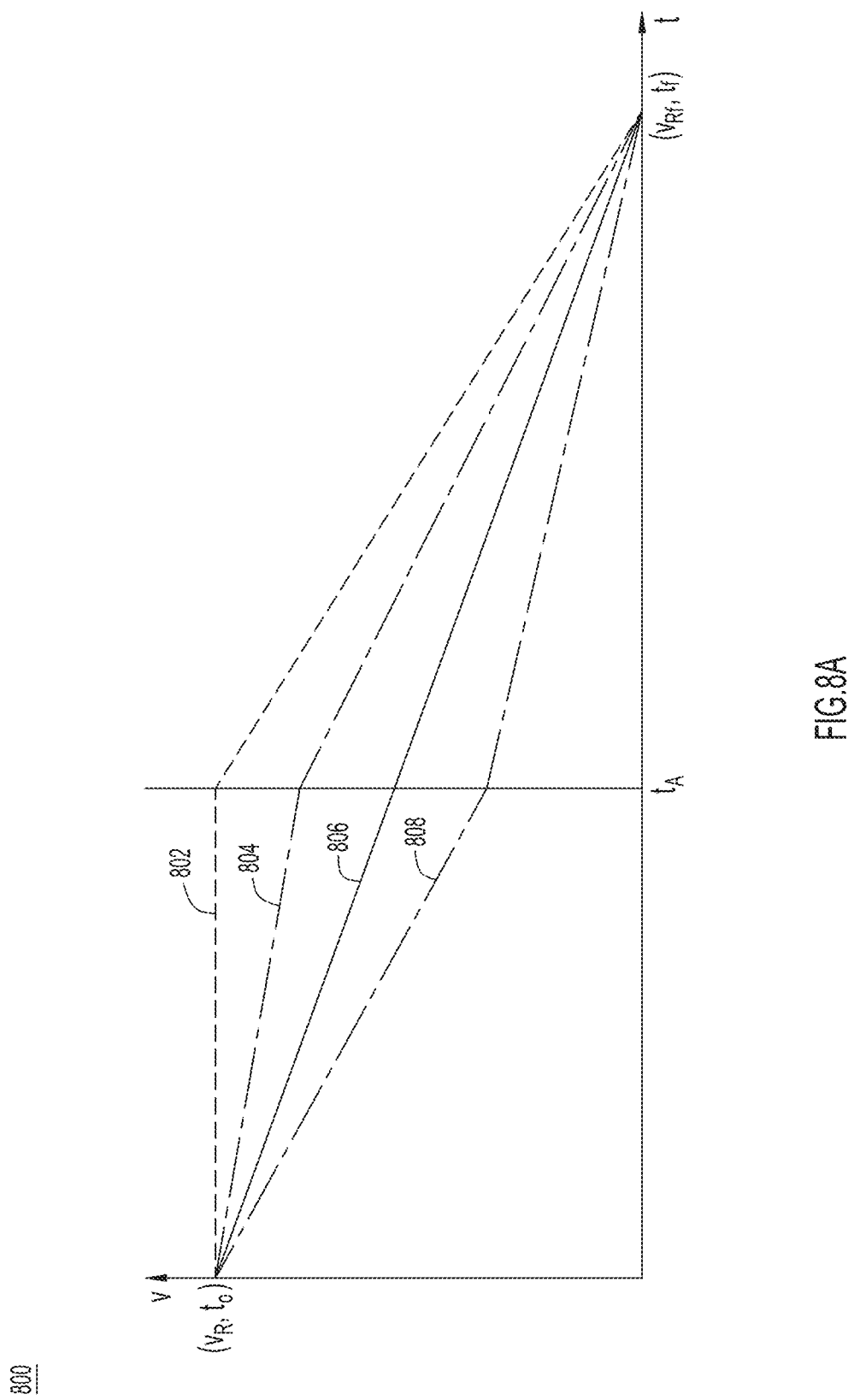

METHODS AND APPARATUS FOR FAILOVER BEHAVIOR OF AUTONOMOUS VEHICLES

CROSS-REFERENCE TO RELATED APPLICATION

This application claims priority under 35 U.S.C. § 119(e) to U.S. Provisional Patent Application No. 63/085,831, entitled "Methods and Apparatus for Failover Behavior of Autonomous Vehicles," filed Sep. 30, 2020, which is hereby incorporated by reference in its entirety.

TECHNICAL FIELD

The disclosure relates to autonomous vehicles, and more particularly, to failover considerations and behaviors that facilitate the safe operation of autonomous vehicles.

BACKGROUND

As the use of autonomous vehicles becomes more prevalent, the ability for the autonomous vehicles to operate safely and reliably is ever increasing. When an autonomous vehicle is confronted with an unexpected situation, the autonomous vehicle must be able to address the unexpected situation. To address an unexpected situation, an autonomous vehicle may determine that it should come to a stop somewhere along a current path, e.g., pull over on the side of the road on which the autonomous vehicle is driving. If a vehicle is unable to pull over, or to otherwise complete a failover, in a safe manner, undesirable consequences such as collisions may occur.

BRIEF DESCRIPTION OF THE DRAWINGS

FIGS. 8A and 8B are diagrams illustrating failover plans and failover plan boundaries generated based on tailgater awareness, according to an example embodiment.

DESCRIPTION OF EXAMPLE EMBODIMENTS

Overview

Figure 1:
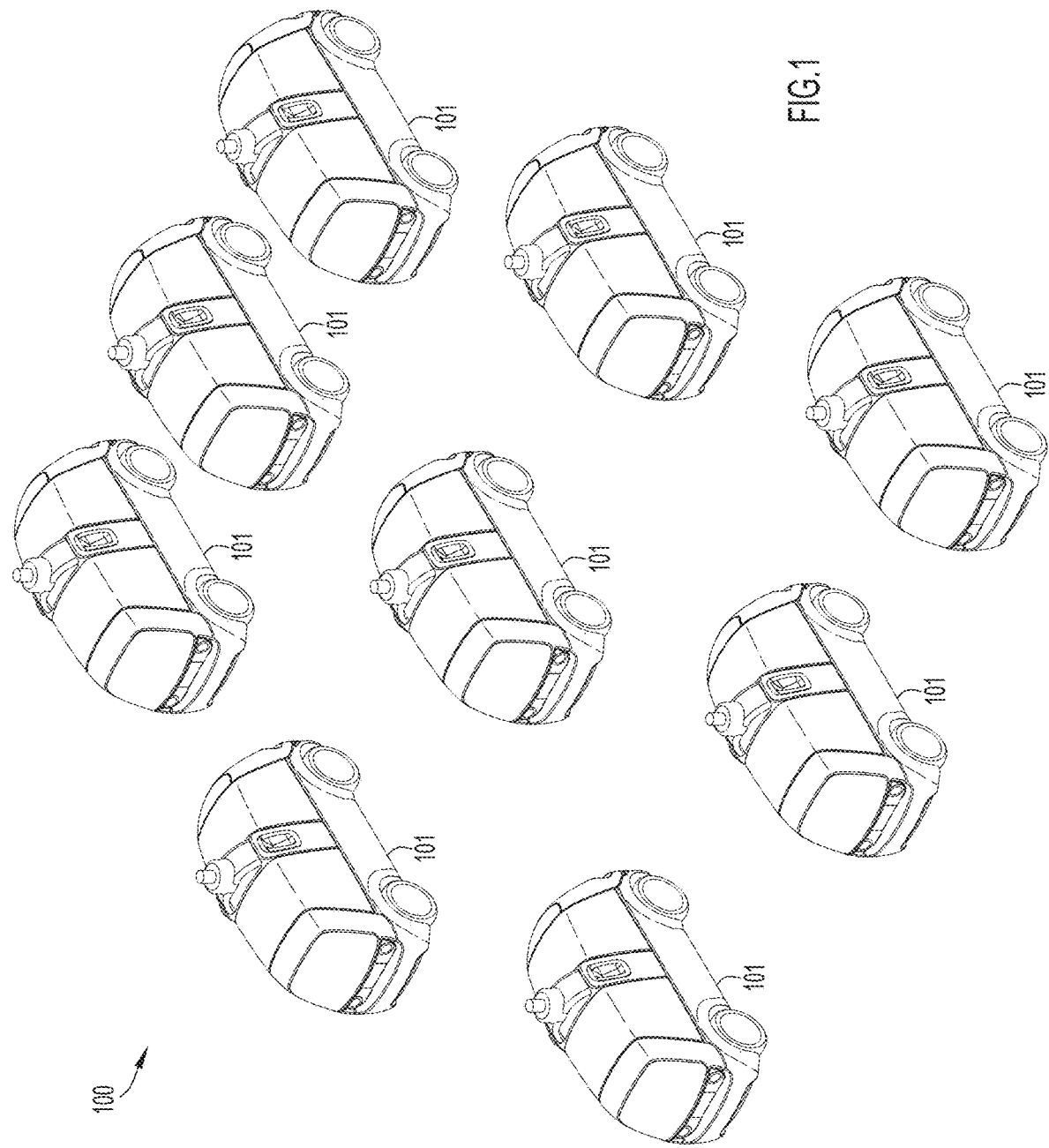
FIG. 1 is a diagram of an autonomous vehicle fleet in which an autonomous vehicle implements a failover plan to perform a failover behavior, according to an example embodiment.

Methods are provided to select and implement a failover behavior process that considers situation awareness when an autonomous vehicle enters a failover condition due to a fault or general inability to continue operating safely. Operation design domains, other users who share a road with the autonomous vehicle, and vehicles traveling close behind the autonomous vehicle (herein call "tailgaters") are considered when determining a deceleration profile, a trajectory length, and a trajectory type for the autonomous vehicle to follow when executing failover behavior.

In one embodiment, a method is performed by an autonomous driving system of an autonomous vehicle, which involves detecting a failover event while the autonomous vehicle, controlled by the autonomous driving system, is traveling along a path and analyzing an environment surrounding the autonomous vehicle to determine whether a tailgater is present behind the autonomous vehicle. The method further involves generating a failover plan for performing a failover behavior based on the failover event and the environment surrounding the autonomous vehicle and engaging the autonomous vehicle to implement the failover plan for performing the failover behavior.

EXAMPLE EMBODIMENTS

When an event occurs that renders it unsafe or otherwise impractical for an autonomous vehicle to continue driving unabated such as the autonomous vehicle being unable to navigate past an upcoming obstacle, the autonomous vehicle may engage in failover behavior. That is, an autonomous vehicle needs to come to a stop safely to address a self-identified fault that does not allow the autonomous vehicle to safely continue driving in a self-identified environment. This process is called a "failover" and may either require a stop-in-path or a pullover to the side of the road. Both of these failover behaviors require the autonomous vehicle to brake and impact other road users. Example embodiments described herein apply to any form of failover. In one example, when an autonomous vehicle engages in failover behavior, the autonomous vehicle may come to a stop by braking substantially immediately. As such, the autonomous vehicle may brake and stop in a lane in which the autonomous vehicle was previously driving or is otherwise positioned.

In one embodiment, how an autonomous vehicle engages in failover may be based on an awareness of a surrounding environment. That is, situational awareness may be used to inform the behavior an autonomous vehicle exhibits when the autonomous vehicle effectively enters a failover condition. By accounting for the surroundings of an autonomous vehicle when determining how and where the autonomous vehicle may safely come to a stop decreases the likelihood that the autonomous vehicle may be involved in a collision or other damaging event upon or after engaging in failover behavior. For example, situational awareness may be used to determine a deceleration profile, a trajectory length, and/or a trajectory type for the autonomous vehicle that may allow the autonomous vehicle to come to a stop at a safe location.

Situational awareness may generally include, but is not limited to including, identifying and/or considering obstacles in a path such as road intersections and/or vehicles, pedestrians, and tailgaters.

An autonomous vehicle, which may engage in failover behavior that is substantially informed by the environment around the vehicle, may generally be included in a fleet of autonomous vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of traveling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
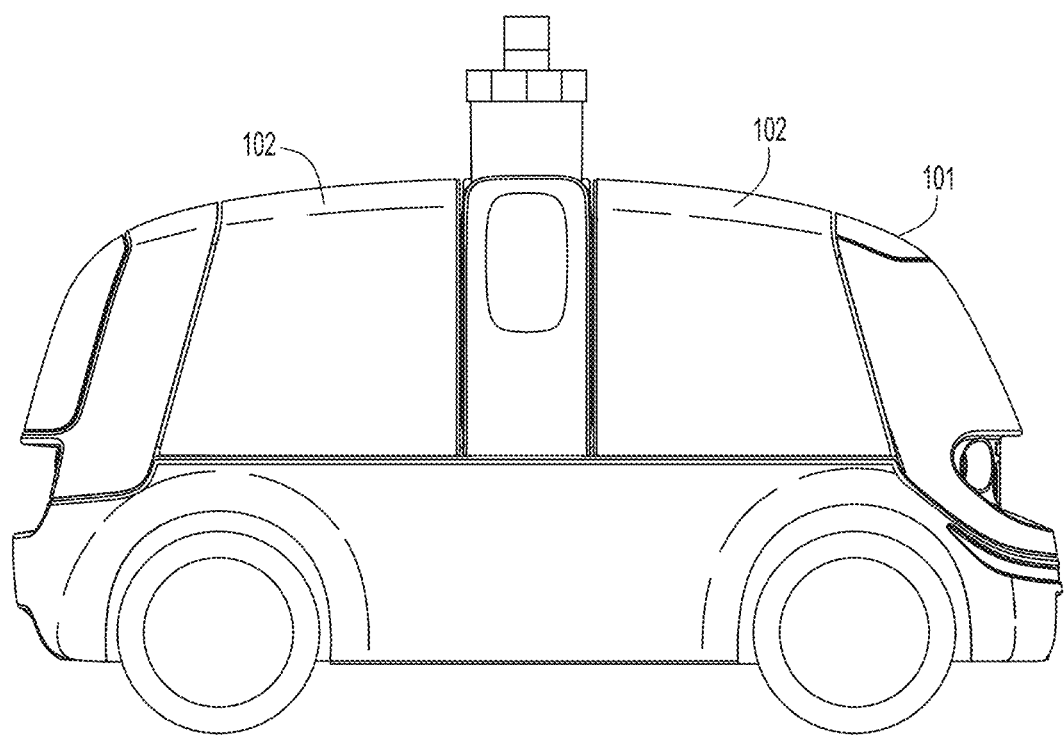
FIG. 2 is a diagram of an autonomous vehicle configured to implement the failover plan to perform a failover behavior, according to an example embodiment.

FIG. 2 is a diagram of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
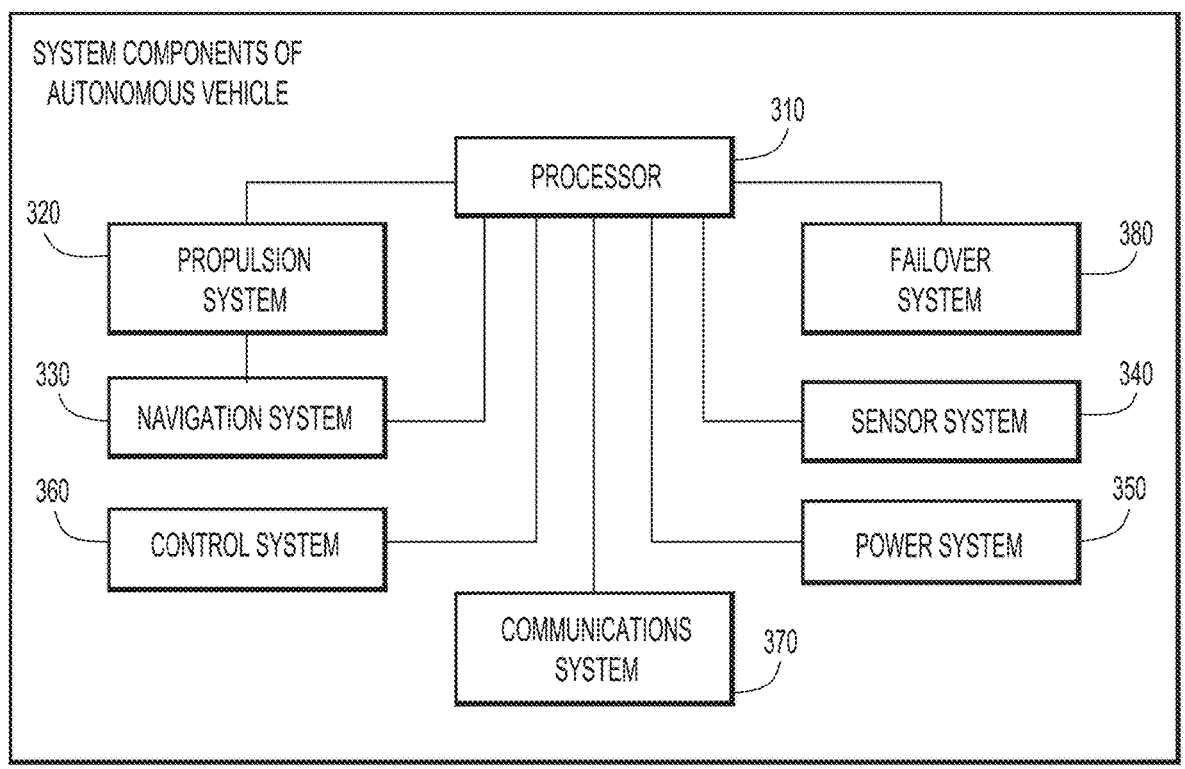
FIG. 3 is a block diagram of components of an autonomous vehicle that implements the failover plan to perform the failover behavior, according to an example embodiment.

FIG. 3 is a block diagram of system components 300 of an autonomous vehicle, e.g., autonomous vehicle 101 of FIG. 1, in accordance with an embodiment. The system components 300 include a processor 310, a propulsion system 320, a navigation system 330, a sensor system 340, a power system 350, a control system 360, and a communications system 370. It should be appreciated that processor 310, propulsion system 320, navigation system 330, sensor system 340, power system 350, and communications system 370 are all coupled to a chassis or body of autonomous vehicle 101. In one embodiment, autonomous vehicle 101 includes a failover system 380 arranged to utilize situational awareness and/or awareness of an environment to substantially execute failover behavior as appropriate.

Processor 310 is arranged to send instructions to and to receive instructions from or for various components such as propulsion system 320, navigation system 330, sensor system 340, power system 350, and control system 360. Propulsion system 320, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 320 may be arranged to cause the engine, wheels, steering, and braking systems to cooperate to drive. In general, propulsion system 320 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 330 may control propulsion system 320 to navigate autonomous vehicle 101 through paths and/or within unstructured open or closed environments. Navigation system 330 may include at least one of digital maps, street view photographs, and a global positioning system (GPS) point. Maps, for example, may be utilized in cooperation with sensors included in sensor system 340 to allow navigation system 330 to cause autonomous vehicle 101 to navigate through an environment.

Sensor system 340 includes any sensors, as for example LiDAR, radar, ultrasonic sensors, microphones, altimeters, and/or cameras. Sensor system 340 generally includes onboard sensors, which allow autonomous vehicle 101 to safely navigate, and to ascertain when there are objects near autonomous vehicle 101. In one embodiment, sensor system 340 may include propulsion systems sensors that monitor drive mechanism performance, drive train performance, and/or power system levels. The sensor system 340 senses the environment surrounding the autonomous vehicle 101.

Power system 350 is arranged to provide power to autonomous vehicle 101. Power may be provided as electrical power, gas power, or any other suitable power, e.g., solar power or battery power. In one embodiment, power system 350 may include a main power source, and an auxiliary power source that may serve to power various components of autonomous vehicle 101 and/or to generally provide power to autonomous vehicle 101 when the main power source does not have the capacity to provide sufficient power.

Communications system 370 allows autonomous vehicle 101 to communicate, as for example, wirelessly, with a fleet management system (not shown) that allows autonomous vehicle 101 to be controlled remotely. Communications system 370 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 360 or a controller may cooperate with processor 310 to determine where autonomous vehicle 101 may safely travel, and to determine the presence of objects in a vicinity around autonomous vehicle 101 based on data, e.g., results, from sensor system 340. In other words, control system 360 may cooperate with processor 310 to effectively determine what autonomous vehicle 101 may do within its immediate surroundings. Control system 360 in cooperation with processor 310 may essentially control power system 350 and navigation system 330 as part of driving or conveying autonomous vehicle 101. Additionally, control system 360 may cooperate with processor 310 and communications system 370 to provide data to or obtain data from other autonomous vehicles 101, a management server, a global positioning server (GPS), a personal computer, a teleoperations system, a smartphone, or any computing device via the communications system 370. In general, control system 360 may cooperate at least with processor 310, propulsion system 320, navigation system 330, sensor system 340, and power system 350 to allow vehicle 101 to operate autonomously. That is, autonomous vehicle 101 is able to operate autonomously through the use of an autonomy system or an autonomous driving system that effectively includes, at least in part, functionality provided by propulsion system 320, navigation system 330, sensor system 340, power system 350, and control system 360.

Failover system 380 may generally include hardware and/or software that enables failover behavior to be identified and substantially executed. For example, when sensor system 340 determines that a failover is effectively needed due to a failure associated with autonomous vehicle 101 and/or a situation around which autonomous vehicle 101 is unlikely to be able to safely navigate, failover system 380 may identify a failover action to be executed. For example, the sensor system 340 senses a failover event in an environment surrounding the autonomous vehicle 101. In addition, failover system 380 may utilize information associated with other systems of autonomous vehicle 101, e.g., sensor system 340 and propulsion system 320, to determine or to otherwise plan appropriate actions associated with a selected failover action. For example, failover system 380 may determine, but is not limited to determining, a deceleration profile, a trajectory length, and/or a trajectory type based on considerations including, but not limited to including, an operational design domain (ODD), the behavior of other road users, and/or the behavior of tailgaters. One embodiment of failover system 380 will be discussed below with reference to FIG. 7.

As will be appreciated by those skilled in the art, when autonomous vehicle 101 operates autonomously, vehicle 101 may generally operate, e.g., drive, under the control of an autonomy system or an autonomous driving system. That is, when autonomous vehicle 101 is in an autonomous mode, autonomous vehicle 101 is able to generally operate without a driver or a remote operator controlling autonomous vehicle 101. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomous driving system. The ability of an autonomous driving system to collect information and extract relevant knowledge from the environment provides autonomous vehicle 101 with perception capabilities. For example, data or information obtained from sensor system 340 may be processed such that the environment around autonomous vehicle 101 may effectively be perceived and provided to a trajectory planner that is configured to plan the movement and/or actions of autonomous vehicle 101. It should be appreciated that a trajectory planner may be associated at least with navigation system 330 and failover system 380.

In one embodiment, when an autonomous vehicle 101 is driving and a failover condition is effectively met such that the autonomous vehicle 101 is to engage in failover behavior, the autonomous vehicle 101 may generally begin decelerating and/or turning as appropriate until the autonomous vehicle 101 comes to a stop, e.g., at a side of a road.

A failover condition or a failover event (these terms are used interchangeably throughout the description) is any obstacle or situation that renders continued driving of the autonomous vehicle 101 unsafe. The failover events include a breakdown or a fault in the autonomous vehicle 101 such as a mechanical failure (e.g., a flat tire) or an electrical failure (e.g., malfunction of one or more of the system components 300). The failover events further include ODD such as an intersection, a closed or ending lane, etc. The failover events further include obstacles (objects or agents) on a path along which the autonomous vehicle 101 is traveling such as a pedestrian, another vehicle, road debris, etc. The failover event may include any combination of these various conditions.

The autonomous vehicle 101 engages in a failover behavior when a failover event is detected. The failover behavior is any behavior that will bring the autonomous vehicle 101 to a safe state after the failover event is detected. The failover behavior includes, by way of an example and not by way of a limitation, stopping the autonomous vehicle 101, accelerating or deescalating the autonomous vehicle 101, moving to a shoulder or another lane on the road. The safe state is a function of (1) seriousness or degree of magnitude of the failover event, (2) obstacles around the autonomous vehicle 101 or in a dynamic region of interest (DRI) of the autonomous vehicle 101, and (3) the ODD. The DRI includes assessing conditions behind the autonomous vehicle 101 such as tailgaters that may, for example, collide with a back of the autonomous vehicle 101.

Typically, the autonomous vehicle 101 does not include any humans inside (passengers and/or drivers). Since human comfort need not be considered, failover behaviors available to the autonomous vehicle 101 may include aggressive braking, multiple instances of braking, aggressive acceleration, swirling, driving over the obstacle, etc. For example, since the autonomous vehicle 101 does not need to consider human comfort, it can wait to brake until the last minute to avoid a failover event. In selecting some of these "autonomous vehicle type" failover behaviors, additional considerations are made, such as the presence of a human tailgater in the DRI. Tailgaters in the DRI include a tailgater directly behind the autonomous vehicle 101 (same lane) and other potential tailgaters that may become directly behind the autonomous vehicle 101 (such as vehicles behind the autonomous vehicle in adjacent lanes or vehicles turning into the same lane of the autonomous vehicle 101 and would be behind the autonomous vehicle 101).

Figure 4:
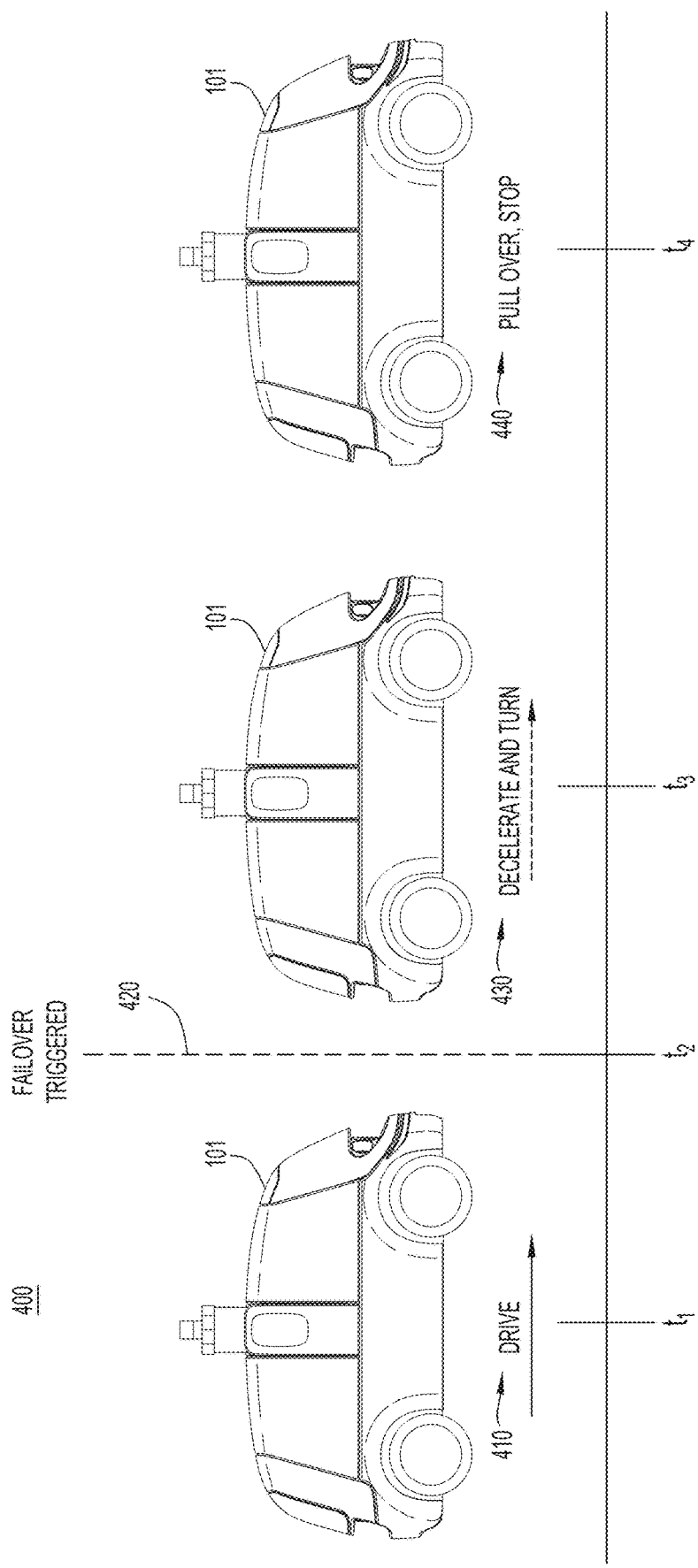
FIG. 4 is a diagram of an autonomous vehicle engaging in a failover plan to perform the failover behavior, according to an example embodiment.

FIG. 4 is a diagram of an autonomous vehicle, e.g., autonomous vehicle 101 of FIGS. 2 and 3, implementing a failover plan 400 to perform a failover behavior, according to an example embodiment.

At a time t1 (410), autonomous vehicle 101 may be driving or otherwise moving along a desired path or route. At a time t2 (420), a failover may be triggered. For example, autonomous vehicle 101 suffers a failover event while operating or determines that it may be necessary or at least prudent for autonomous vehicle 101 to pull over and to stop. When a failover is triggered, or when a failover condition is effectively met, autonomous vehicle 101 may select an appropriate failover behavior based on situational awareness. In other words, based on the detected failover event, autonomous vehicle 101 decides to transition to a safe state (perform a failover behavior).

The failover plan 400 includes, at a time t3 (430), autonomous vehicle 101 begins to decelerate and/or to turn as substantially specified by a selected failover behavior. For example, autonomous vehicle 101 may begin to decelerate and to turn, or to otherwise change its positional orientation, such that autonomous vehicle 101 may subsequently pull over at a side of a road.

At a time t4 (440), autonomous vehicle 101 has reached a pull over location (safe state). In other words, autonomous vehicle pulls over and comes to a stop at time t4 (440).

When identifying an appropriate failover behavior based on awareness of a surrounding environment, vehicle 101 may essentially analyze agents in the surrounding environment to determine how vehicle 101 may account for the presence and behavior of the agents when executing the failover behavior. That is, vehicle 101 may take failover considerations into account when determining how to execute failover behavior.

Figure 5:
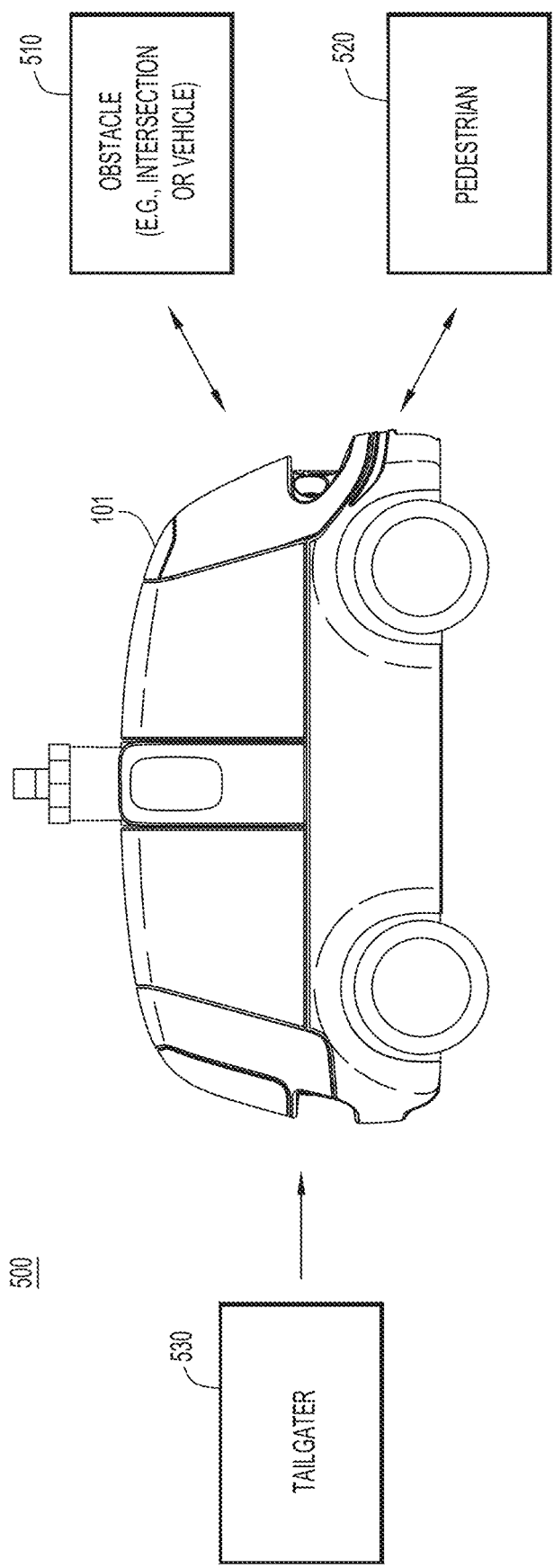
FIG. 5 is a diagram of failover considerations that may be addressed by an autonomous vehicle, according to an example embodiment.

FIG. 5 is a diagram of failover considerations 500 which may be addressed by an autonomous vehicle, in accordance with an embodiment.

As autonomous vehicle 101 drives, autonomous vehicle 101 may encounter obstacles 510 such as an intersection or another vehicle in a path or a route that is to be traversed by vehicle 101, e.g., a planned path or route of vehicle 101. It should be appreciated that an intersection may be a location on one road at which another road crosses, a juncture on a first road at which another road or a driveway may substantially connect to the first road. Vehicle 101 may also encounter a pedestrian 520 along a path or a route that is to be traversed by vehicle 101.

While other vehicles may generally be obstacles 510 along a path traversed by vehicle 101, other vehicles may effectively follow vehicle 101. For example, a tailgater 530 may follow vehicle 101 in relatively close proximity and/or at a relatively high speed in comparison to a speed at which vehicle 101 is traveling. Tailgater 530 may generally be a vehicle, which is driving behind vehicle 101 and not maintaining a distance that may generally be considered sufficient to allow vehicle 101 to come to a sudden stop without causing tailgater 530 to collide with vehicle 101. In other words, a tailgater 530 is behind the vehicle 101 and in its DRI such that if the vehicle 101 is to perform one of its "autonomous vehicle type" failover behaviors, a collision with the tailgater 530 is possible.

When determining the environment around vehicle 101 to facilitate the execution of a selected failover behavior, vehicle 101 may analyze obstacle 510, pedestrian 520, and/or tailgater 530. The presence, characteristics, and/or actions of obstacle 510, pedestrian 520, and/or tailgater 530 may be used by vehicle 101 to determine how to execute a selected failover behavior. By way of example, anticipated movements of pedestrian 520 and tailgater 530 may be used to inform how to execute a selected failover behavior (to generate a failover plan), and when obstacle 510 is an upcoming intersection along a route travelled by vehicle 101, the type of intersection that is upcoming may be used to inform how to execute a selected failover behavior. The failover system 380 of FIG. 3 in the vehicle 101 analyzes the environment surrounding the vehicle 101, which includes obstacle 510, pedestrian 520, and/or tailgater 530 and balances these various factors to generate the failover plan to perform a failover or a selected failover behavior.

In one embodiment, failover behavior may include causing a vehicle to decelerate and then to pull over at an available safe stopping location, e.g., a safe shoulder at the side of the road on which the vehicle is traveling. To enable the vehicle to pull over, the vehicle may turn or otherwise change its trajectory, e.g., a shape of a vehicle trajectory. Typically, a failover plan may include a movement profile (e.g., deceleration profile), a trajectory length, and/or a trajectory type. A deceleration profile may include, but is not limited to including, a rate of deceleration and/or target velocities over time. A trajectory length may include, but is not limited to including, a distance to be travelled by the vehicle until the vehicle reaches a stopping location. A trajectory type may include, but is not limited to including, an indication of whether the vehicle is to come to a stop substantially immediately or whether the vehicle is to pullover at a safe stopping location.

A substantially maximum trajectory length associated with a failover may effectively be capped using situational awareness of ODD, other road users, and/or tailgaters. For example, tailgater awareness may effectively cap the aggressiveness of deceleration that may be undertaken by a vehicle. Generally, the prioritization of ODD, other road users, and/or tailgaters may vary depending upon any number of factors including, but not limited to including, weather conditions, road conditions, factors relating to the behavior of a tailgater, factors relating to the behavior of other road users, etc. In one embodiment, other road users, such as pedestrians and other moving objects in front of a vehicle may be substantially prioritized over tailgaters.

A deceleration profile, a trajectory profile, and a trajectory type may be used for motion planning and selection during an overall failover process. A motion planner may use information from sensors of a vehicle (sensor system 340 of FIG. 3) to essentially avoid collisions with other road users and/or tailgaters during failover.

An ODD, such as an intersection may be used to provide situational awareness to determine a failover behavior. In general, there are four different types of intersections. A first type of intersection is one in which a vehicle approaching the intersection will effectively never have a right-of-way, e.g., an intersection with a two-way stop where the vehicle has a stop sign and must stop at the intersection or an intersection that includes a turn onto a road from a parking lot. A second type of intersection is one in which a vehicle approaching the intersection has the right-of-way upon first arrival, e.g., an intersection that includes a four-way stop. A third type of intersection is one in which a vehicle approaching the intersection substantially always has a right-of-way, e.g., an intersection with a two-way stop in which the vehicle is on a road for which there is no stop sign. A fourth type of intersection is one in which a right-of-way is determined by a traffic signal.

In addition to accounting for intersections that may potentially be along the path of a trajectory associated with a selected failover behavior, the ability for a vehicle to come to a substantially full stop within a safe distance of pedestrians, parked vehicles, and/or foreign object debris. A safe distance may vary widely, and may generally define a buffer around a vehicle, which is substantially clear when the vehicle is pulled over. In one embodiment, such a buffer may be defined by a relatively straightforward kinematics model, and may account for evasive measures for other road users.

Other agents or road users that are tailgaters may be accounted for by considering that a tailgater may be allowed sufficient physical reaction time and deceleration capability to avoid a rear-end collision with a vehicle, e.g., an autonomous vehicle 101 of FIGS. 2 and 3, as the vehicle slows and comes to a full stop. Tailgater's velocity is considered including a positive acceleration of the tailgater if it is happening at the time of trajectory computation. As such, a deceleration profile of the autonomous vehicle may be affected by a profile of a tailgater.

In one example embodiment, failover trajectories are assumed to be executed blindly. That is, without any re-planning at the time a failover is triggered or during execution of that trajectory. Failover trajectories are computed alongside every nominal trajectory. When a failover triggers, then the failover trajectory computed at the last invocation is used. In other words, the trajectories are planned when the autonomous vehicle 101 is at its healthy state (not in the process of executing a failover). Which trajectory is executed at a given time is then determined by the health of the autonomous vehicle 101. The trajectories account for environmental context and specifically, how to plan a failover trajectory when there is a tailgater.

FIGS. 6A-6E are flow charts illustrating a method 600 of performing or otherwise executing a failover plan for an autonomous vehicle, according to an example embodiment. The method 600 is performed by an autonomous driving system (the system components 300) of the vehicle 101.

The method 600 of performing a failover plan for an autonomous vehicle begins at a step 602 in which a failover behavior or action is selected for an autonomous vehicle. In one embodiment, the vehicle selects the failover behavior. It should be appreciated, however, that the failover behavior is not limited to be selected by the vehicle. By way of example, a remote party such as a fleet manager may select the failover behavior and then communicate the selection to the vehicle.

The failover behavior is selected when it is determined that the vehicle is unable, for example, to continue to travel between a source and a destination safely and/or reliably. The failover behavior may be selected to identify a suitable location at which the vehicle may safely pullover. The failover behavior may include following a failover trajectory, which has a trajectory length and a trajectory type. It should be appreciated that the failover trajectory generally also has a shape, e.g., the trajectory may include one or more changes in direction or turns.

In one embodiment, situational awareness may be considered when executing a failover behavior. For example, if the execution of the failover behavior may involve the vehicle approaching, and potentially driving through an intersection, the intersection may be characterized to inform the execution of the failover behavior.

At 604, a determination is made whether the vehicle is approaching an intersection, or whether there is an intersection along a trajectory associated with the failover behavior selected at 602. In other words, the ODD is analyzed to determine if an intersection needs to be considered in generating a failover plan. If it is determined that the vehicle is approaching an intersection, the indication is that any actual behavior undertaken by the vehicle may be at least partially dependent upon the type of intersection that the vehicle is approaching. If at 604, it is determined that the vehicle is not approaching an intersection, the method 600 proceeds to 614 described below with reference to FIGS. 6D and 6E.

If at 604, it is determined that the vehicle is approaching an intersection, the method 600 proceed to 606. At 606, a determination is made as to whether the intersection is such that the vehicle substantially never has the right-of-way. For example, the vehicle substantially never has the right-of-way at an intersection with a two-way stop when the vehicle is subject to a stop sign, when an intersection involves the vehicle turning out of a parking lot or a driveway onto a road, and/or when the intersection includes a traffic light that is red for a direction of travel of the vehicle. If the determination at 606 is that the vehicle substantially never has the right-of-way, at 608, the vehicle may be stopped before reaching the intersection. Upon stopping the vehicle, the method 600 of performing a failover for an autonomous vehicle is completed. In other words, the failover plan to perform the failover behavior is completed and the vehicle reached the safe state.

Alternatively, if the determination at 606 is that the intersection is not such that the vehicle never has the right-of-way, the indication is that the vehicle may have the right-of-way. Accordingly, at 610, a determination is made as to whether the vehicle has a right-of-way on first arrival. That is, it is determined if the vehicle would have the right-of-way if the vehicle is effectively the first vehicle or agent to arrive at the intersection. The vehicle may have the right-of-way on first arrival if the intersection has a traffic light that is green but the vehicle needs to yield to oncoming traffic and/or if the intersection is a four-way stop. If the determination at 610 is that the vehicle has a right-of-way on first arrival, the vehicle may be stopped before reaching the intersection at 608. After the vehicle is stopped, the method 600 of performing a failover for an autonomous vehicle is completed.

If the determination at 610 is that the vehicle does not have a right-of-way on first arrival, the implication is that the vehicle may substantially always have a right-of-way. Accordingly, the method 600 proceeds to 612 in FIG. 6B.

The path of 612 is taken when it is determined that the vehicle does not have the right-of-way on first arrival. As such, at 616, a determination is made whether the vehicle substantially always has a right-of-way. If the determination is that the vehicle does not always have the right-of-way (no at 616), the indication may be that the intersection has a traffic signal. As will be appreciated by those skilled in the art, the traffic signal may change from red to green, or from green to yellow to red, as the vehicle approaches. The traffic signal may, at times, indicate that the vehicle always has a right-of-way, e.g., when displaying a green arrow.

If the determination is that the vehicle does not substantially always have the right-of-way, then at 618, the vehicle may follow the traffic signal to determine appropriate right-of-way. The appropriate right-of-way may be associated with the traffic signal indicating that the vehicle does not have a right-of-way, or that the vehicle has a right-of-way on first arrival. As such, the method 600 returns to step 606 in which a determination is made as to whether the vehicle never has a right-of-way.

Alternatively, if the determination at 616 is that the vehicle substantially always has the right-of-way, then at 620, it is determined whether the vehicle is followed by a tailgater. That is, it is determined whether there is agent such as another vehicle that is following the vehicle in relatively close proximity (in the DRI). The factors used to determine whether an agent is a tailgater may include, but not limited to including, a speed at which the agent is traveling, a separation distance between the agent and the vehicle, and whether the agent is accelerating.

If the determination at 620 is that there is no tailgater, then the method 600 returns to 608. At 608, the vehicle is stopped before entering the intersection. On the other hand, if the determination at 620 is that the vehicle is followed by a tailgater, the tailgater may be analyzed at 622. Analyzing the tailgater may include, but is not limited to, determining whether the execution of a selected failover behavior may allow for a sufficient physical reaction time for the tailgater to decelerate and to stop without colliding with the vehicle. Such a determination may involve considering characteristics of the tailgater, e.g., braking capabilities of the tailgater, as well as a separation distance between the vehicle and the agent, and a speed or velocity at which the tailgater is traveling. In one embodiment, analyzing the tailgater involves determining if the tailgater, upon coming to a stop, is at least a predefined distance or at least a buffer distance away from the vehicle.

Once the tailgater is analyzed at 622, it is determined at 624 whether the vehicle may stop, i.e., safely stop, before reaching the intersection. If it is determined that the vehicle may safely stop before reaching the intersection, the method 600 returns to 608. At 608, the vehicle comes to a stop before the intersection. Alternatively, if it is determined at 624 that the vehicle may not stop before reaching the intersection, then the method 600 proceeds to 626 in FIG. 6C.

Specifically, at 627, the vehicle crosses the intersection substantially without failover trajectory overlap and tailgater consideration. In one embodiment, the vehicle travels through the intersection as if there is effectively no overlap with vehicular oncoming traffic, vehicular cross traffic, pedestrian movement, and/or any lead vehicle traveling in substantially the same direction in front of the vehicle. The vehicle may also effectively assume that the tailgater may have the ability to decelerate and come to a stop safely, e.g., without colliding with the vehicle.

Once the vehicle crosses the intersection, the failover behavior or action is completed at 628. Completing the failover generally includes the vehicle pulling over safely on the side of the road on which the vehicle is traveling. After the failover is completed, the method 600 of performing a failover for an autonomous vehicle is completed.

Figure 6A:
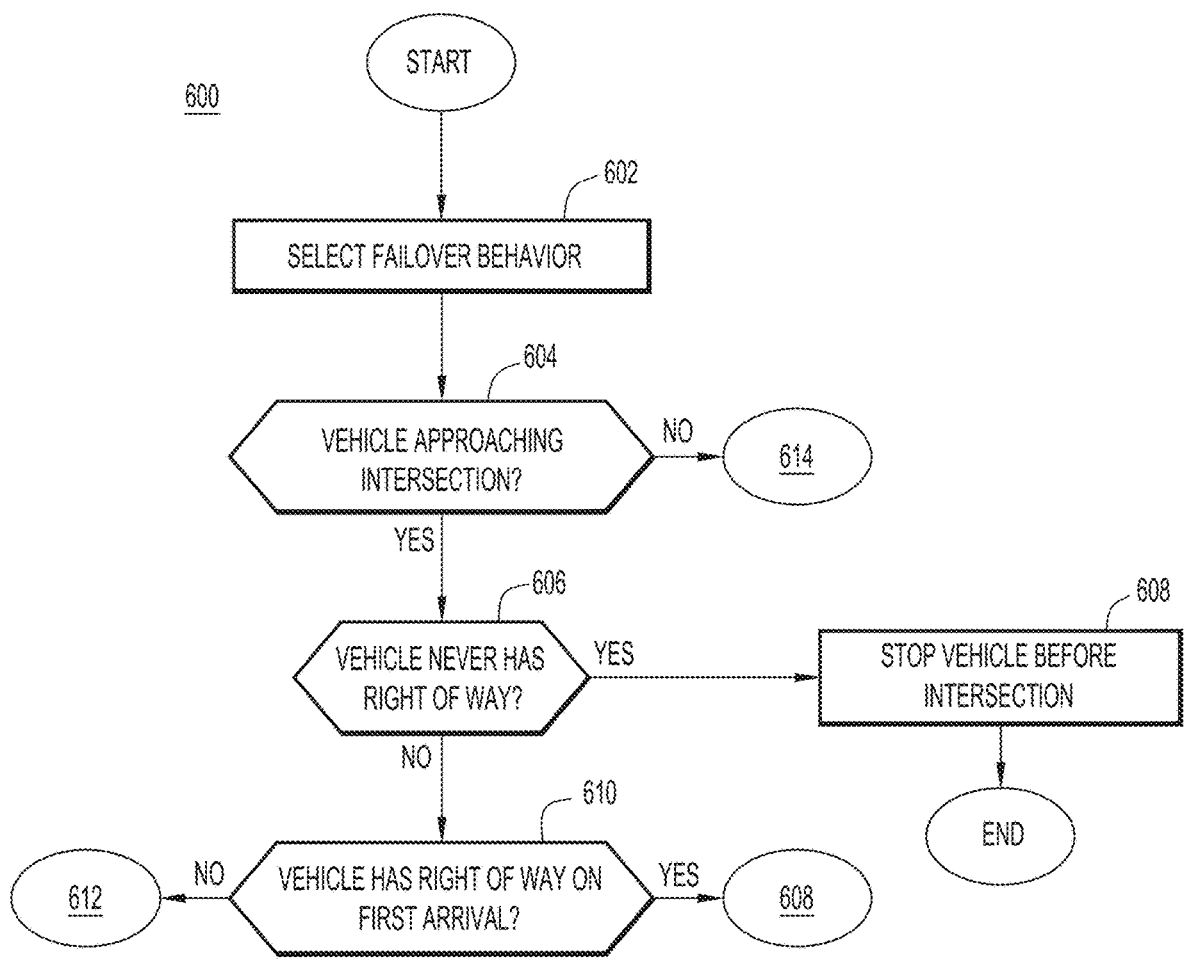
FIGS. 6A-6E are flow charts illustrating a method of performing or otherwise executing a failover plan for an autonomous vehicle, according to an example embodiment.
Figure 6B:
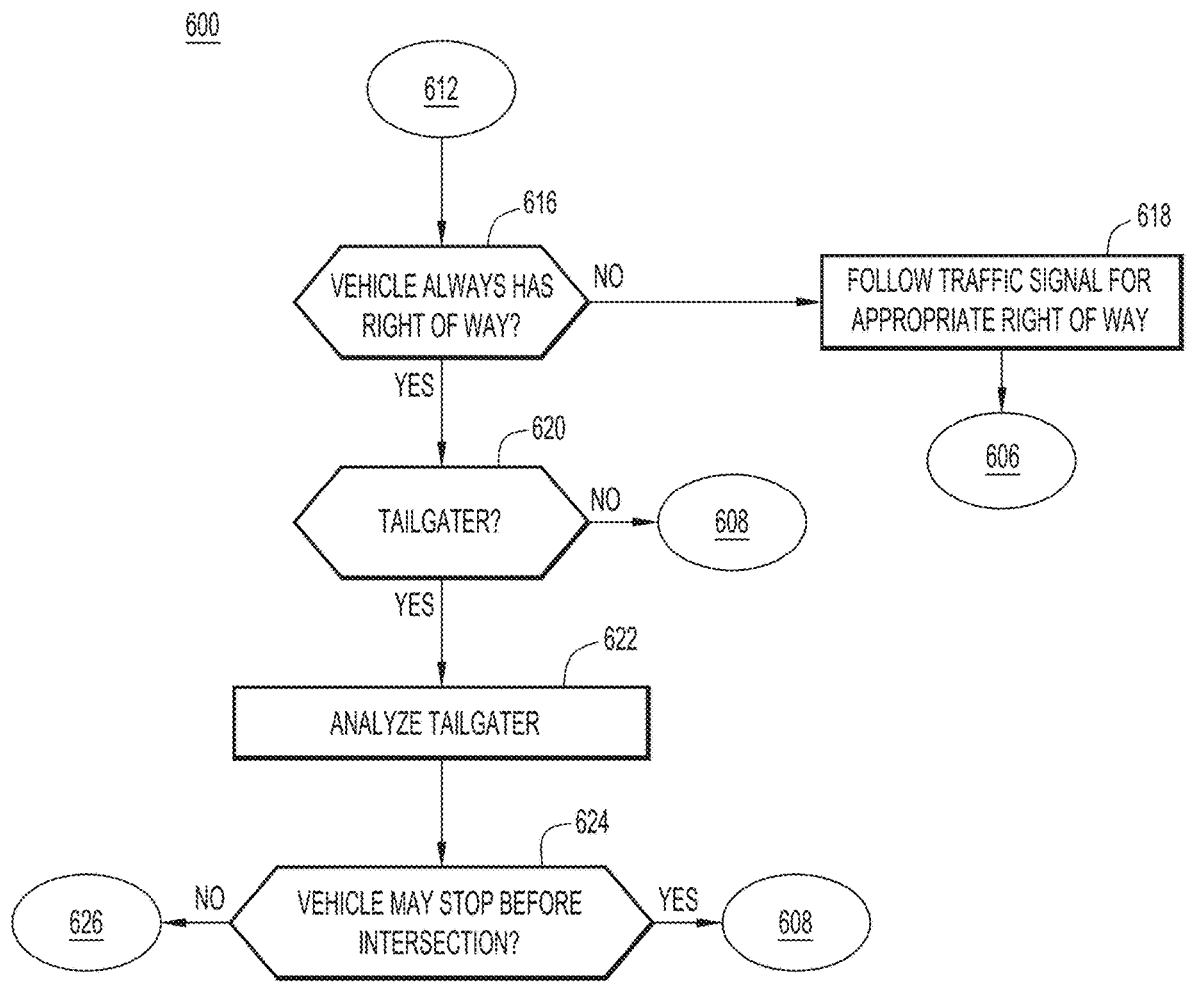
Figure 6C:
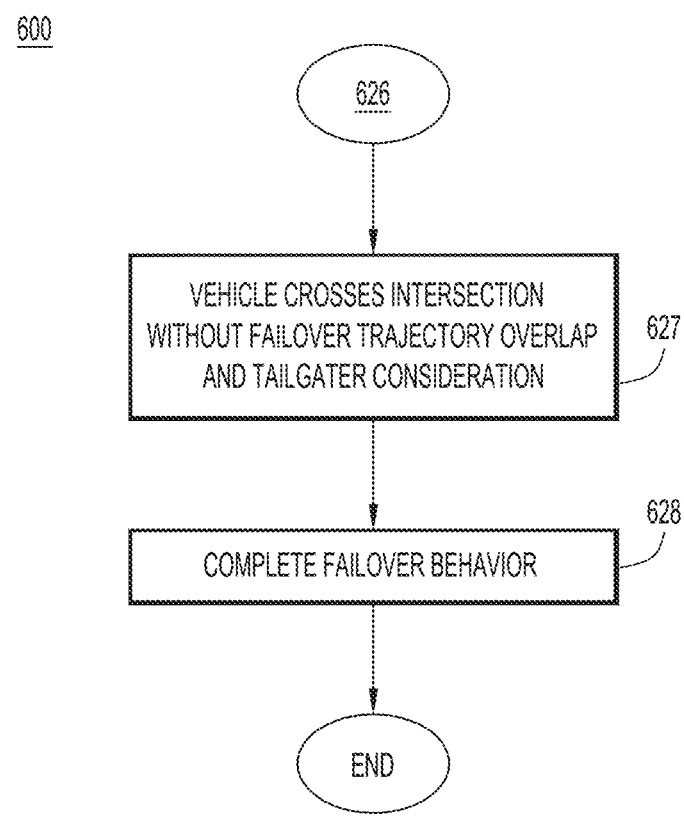
Figure 6D:
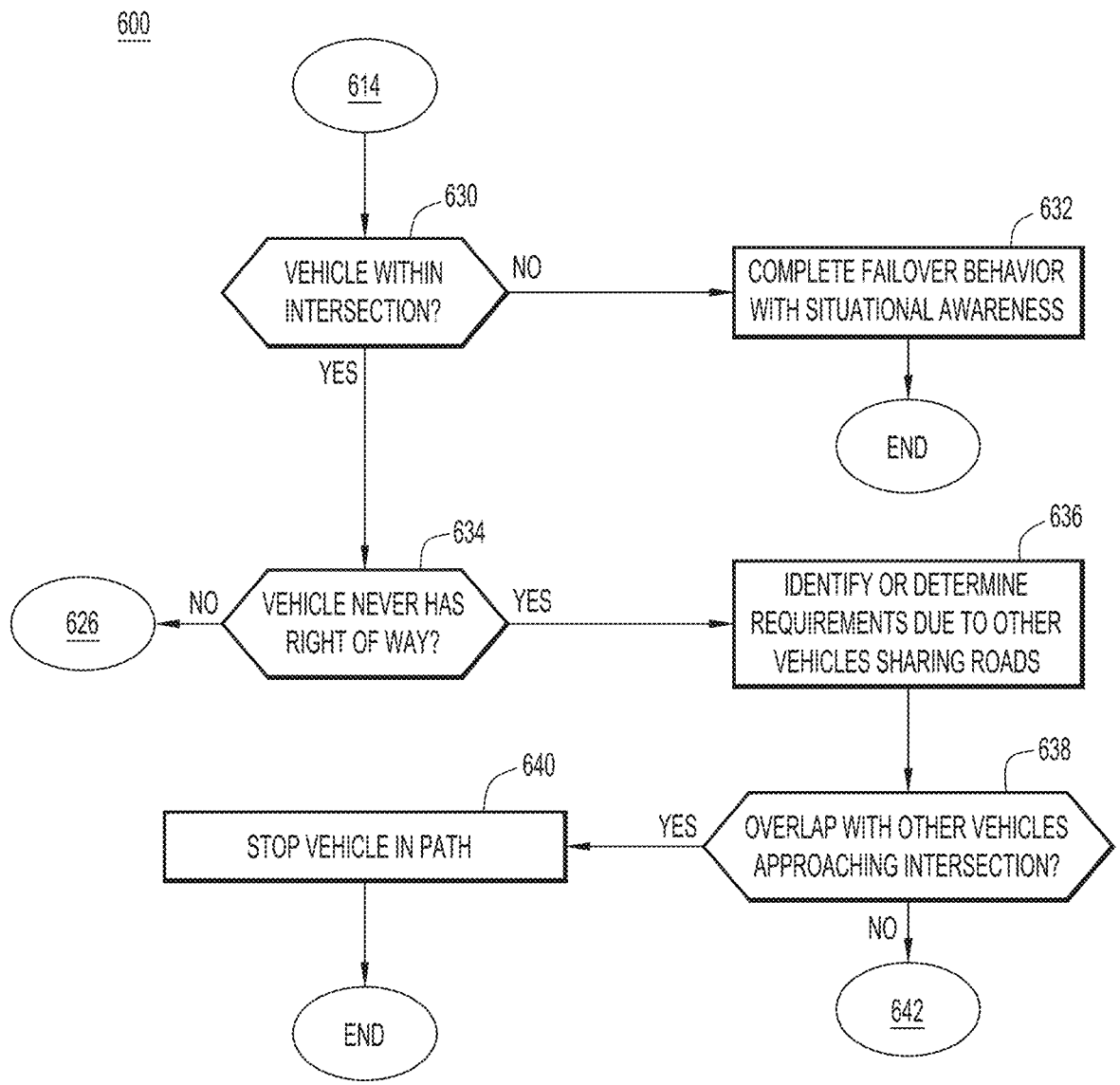

Referring back to FIG. 6A, the method 600 is now explained when at 604, it is determined that the vehicle is not approaching the intersection and the method 600 proceeds to 614 in FIG. 6D.

At 614, the indication is that the vehicle is not approaching an intersection and the method 600 then proceed to 630. At 630, it is determined if the vehicle is within an intersection, i.e., currently traveling through an intersection. If the determination is that the vehicle is not currently within an intersection, then the failover behavior or action is completed while accounting for situational awareness at 632. Accounting for situational awareness may include, but is not limited to, determining whether there is a potential overlap with vehicular oncoming traffic, with pedestrian activity, and with a lead vehicle. Tailgater awareness is also considered as part of situational awareness. Once failover behavior is completed, while incorporating situational awareness, the method 600 of performing failover for an autonomous vehicle is completed. Accounting for the situational awareness includes balancing various considerations in the environment surrounding the vehicle including obstacles along the path and the tailgater.

Alternatively, if it is determined at 630 that the vehicle is within an intersection, a determination is made at 634 whether the vehicle never has a right-of-way. If the determination is that it is not the case that the vehicle never has a right-of-way, the indication is that the vehicle may have a right-of-way. As such, the method 600 returns to 626 of FIG. 6C in which the vehicle crosses the intersection substantially without failover trajectory overlap and tailgater consideration.

On the other hand, if the determination is that the vehicle never has the right-of-way, then, at 636, requirements and/or guidelines relating to other vehicles sharing roads may be determined or otherwise identified. For example, a buffer distance for stopping the vehicle may be defined as a function of the velocity of another vehicle in oncoming traffic, the velocity of the vehicle, and a separation distance. Such a buffer distance may account for the behavior of another vehicle in oncoming traffic. In addition, if another vehicle is a lead vehicle sharing the road with the vehicle, but in front of the vehicle, then a buffer distance for stopping the vehicle may be defined as a function of the velocity of the lead vehicle, the velocity of the vehicle and a separation distance. Vehicular cross traffic may also be accounted for, and a potential point of collision between the vehicle and another vehicle in cross traffic may be a function of a current velocity of the other vehicle in cross traffic, the velocity of the vehicle, and a separation distance. Further, allowing the vehicle to accelerate past the collision point may be a priority or, if the vehicle is unable to safely accelerate past the collision point, stopping before the collision point may be a priority.

Once the requirements are determined or otherwise identified at 636, a determination is made at 638 as to whether there is overlap between the vehicle and other vehicles approaching the intersection. That is, it is determined whether the requirements effectively indicate that there is overlap between the vehicle and other vehicles, e.g., such that a trajectory may have to be changed to avoid a collision.

If the determination at 638 is that there is overlap between the trajectory of the vehicle and the trajectories of other vehicles approaching the intersection, then at 640, the vehicle is stopped in its path. Stopping the vehicle in its path may prevent a collision with other vehicles when there is overlap with other vehicles. In one example embodiment, "autonomous vehicle type" failover behavior may be performed such as aggressive braking or steering. After the vehicle is stopped in its path, the method 600 of performing a failover for an autonomous vehicle is completed.

Figure 6E:
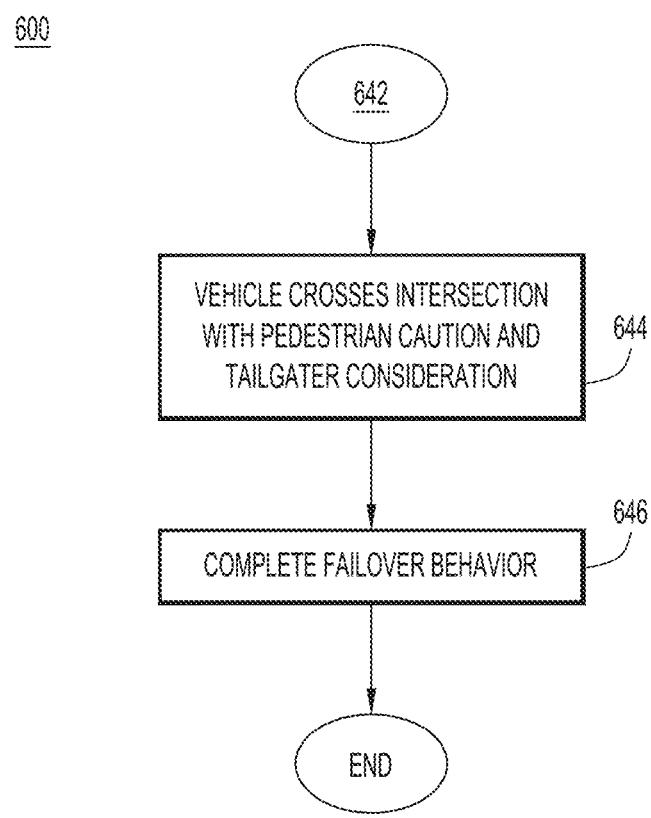

Alternatively, if it is determined that there is no overlap between the trajectory of the vehicle approaching the intersection at 638, the method 600 proceeds to 642 in FIG. 6E.

Specifically, at 644, the vehicle crosses or otherwise travels through the intersection with pedestrian caution and tailgater consideration. That is, situational awareness of pedestrian and tailgater actions may be substantially analyzed. A consideration of pedestrian caution may involve identifying potential movements of a pedestrian, and identifying a buffer distance for stopping the vehicle that is a function of a separation distance between the vehicle and the pedestrian, and a velocity of the vehicle. Tailgater consideration may include, but is not limited to, analyzing a model that proposes a deceleration profile for a tailgater as a function of a tailgater travel velocity, a vehicle velocity, deceleration capabilities of the tailgater, and/or a physical reaction time of the tailgater. Once the vehicle crosses the intersection, the vehicle completes its failover behavior at 646, the method 600 of performing a failover for an autonomous vehicle is completed.

Figure 7:
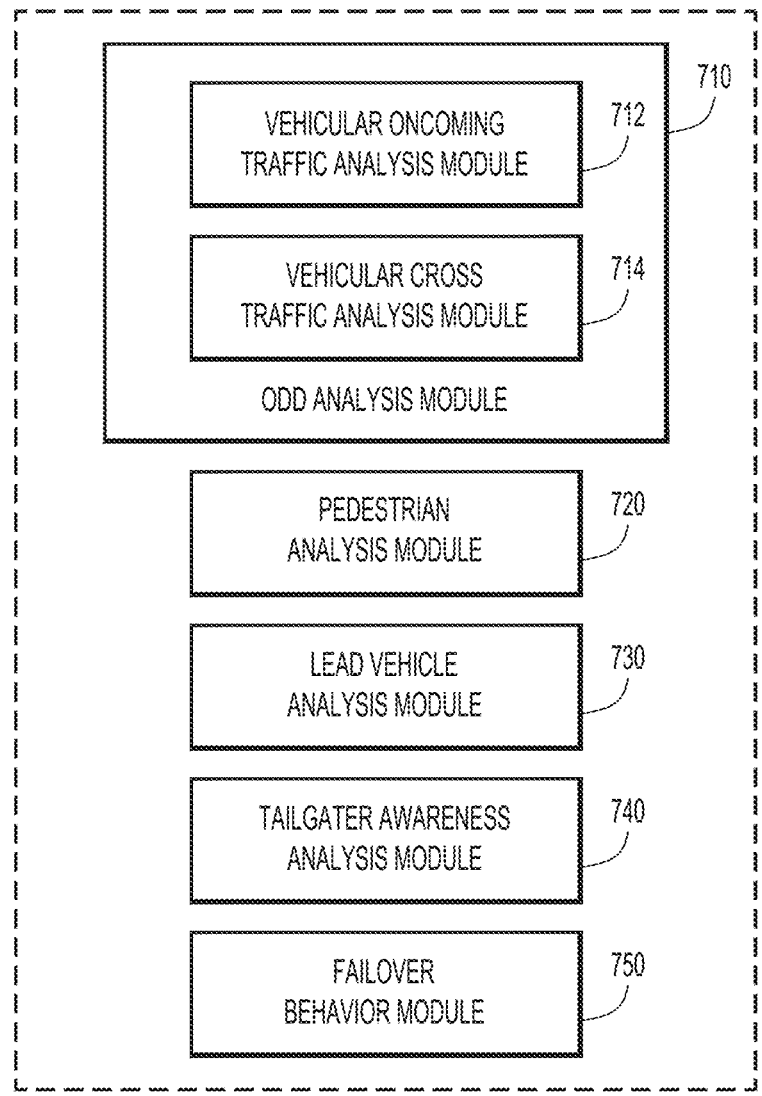
FIG. 7 is a block diagram of a failover system of an autonomous vehicle, according to an example embodiment.

FIG. 7 is a block diagram of a failover system 380 of FIG. 3, in accordance with an embodiment. Failover system 380, which may include hardware and/or software embodied in a computer-readable medium, is configured to determine a failover behavior, and to apply situation awareness to the execution of the failover behavior (generate a failover plan). Failover system 380 includes an ODD analysis module 710, a pedestrian analysis module 720, a lead vehicle analysis module 730, a tailgater awareness analysis module 740, and a failover behavior module 750 that is configured to identify potential failover behaviors as well as to select a failover behavior to execute and generate an execution or a failover plan for performing the selected failover behavior. ODD analysis module 710 may generally analyze weather conditions and intersections, and includes a vehicular oncoming traffic analysis module 712 and a vehicular cross traffic analysis module 714.

Vehicular oncoming traffic analysis module 712 is configured to characterize oncoming traffic such that a failover behavior may be executed while accounting for any vehicular oncoming traffic. Vehicular oncoming traffic analysis module 712 may determine a buffer distance for stopping an autonomous vehicle, e.g., autonomous vehicle 101 of FIGS. 2 and 3, which is defined as a function of the velocity of an oncoming vehicle, the velocity of the autonomous vehicle, and a separation distance. In one embodiment, oncoming traffic that is on an opposite side of a median or a double yellow line from the autonomous vehicle may be substantially ignored.

Vehicular cross traffic analysis module 714 is configured to characterize cross traffic associated with intersections. Vehicular cross traffic analysis module 714 may identify a potential collision point between an autonomous vehicle and an agent in an intersection, e.g., a vehicle in cross traffic, based at least on a current velocity of the agent, a velocity of the autonomous vehicle, and a separation distance. Vehicular cross traffic analysis module 714 may, in one embodiment, account for potential braking by the agent to avoid a collision. Vehicular cross traffic analysis module 714 may prioritize avoiding a collision such that the autonomous vehicle may accelerate past the collision point to cross the intersection if possible or, if not possible, may prioritize avoiding a collision by coming to a stop before the collision point.

Pedestrian analysis module 720 is configured to analyze at least a velocity of an autonomous vehicle and a separation distance between a pedestrian and the autonomous vehicle, such that the autonomous vehicle may execute a selected failover behavior while enabling the autonomous vehicle to stop within a buffer distance from a pedestrian.

Lead vehicle analysis module 730 is configured to analyze characteristics of a vehicle that is in front of an autonomous vehicle when the autonomous vehicle is traveling. Lead vehicle analysis module 730 may determine a buffer distance between a lead vehicle and the autonomous vehicle when the autonomous vehicle stops. Such a buffer distance may be defined as a function of a velocity or the autonomous vehicle, a velocity of the lead vehicle, and a separation distance between the autonomous vehicle and the lead vehicle.

Tailgater awareness analysis module 740 may generally utilize methods, calculations, modeling, and/or mathematical algorithms to analyze a tailgater to determine whether a failover behavior for an autonomous vehicle may be executed in view of the presence of the tailgater. In general, tailgater awareness module 740 may assume that a tailgater, e.g., a tailgater vehicle driven at an unsafe speed or at an unsafe distance from another vehicle by a human, is to be allowed sufficient physical reaction time and deceleration capability to avoid a collision with an autonomous vehicle or, more generally, a vehicle directly in front of the tailgater.

Tailgater awareness analysis module 740 may utilize a model that effectively proposes a deceleration profile, which may be a function of autonomous vehicle and tailgater velocities, deceleration capabilities, and, if appropriate, a human physical reaction time associated with the driver of a tailgater vehicle. Such a model may be arranged to output a stopping distance of a tailgater and an autonomous vehicle such that the tailgater and the autonomous vehicle may be separated by a predefined buffer distance when stopped. In one embodiment, a total stopping distance for the tailgater may be a function of the distance the tailgater travels while not reacting to the autonomous vehicle and a distance travelled when the tailgater reacts and comes to a complete stop. The displacement of the tailgater may be a function of the velocity of the agent and a reaction time when the tailgater is not reacting. The displacement of the tailgater when the tailgater reacts may be a function of the velocity of the tailgater and the current deceleration of the tailgater.

In some embodiments, tailgater awareness analysis module 740 may perform additional analysis to determine deceleration profiles of human drivers, and may account for realistic vehicle and tailgater behaviors. For example, analysis may be performed such that situational awareness relating to the tailgater continuing acceleration when not reacting to the presence of the autonomous vehicle is accounted for. It should be appreciated that an accelerating tailgater may have difficulty reacting to an autonomous vehicle in front of the tailgater upon realizing that a collision may occur.

When an autonomous vehicle brakes, the autonomous vehicle may be unable to achieve a substantially instantaneous deceleration because the brake system on the autonomous vehicle has a jerk limit. Thus, tailgater awareness analysis module 740 may determine a deceleration of an autonomous vehicle while accounting for a commanded acceleration, a signed jerk limit, an initial signed acceleration, and/or an initial velocity.

While an autonomous vehicle may include an anti-lock brake system, in some instances, an autonomous vehicle may not include an anti-lock brake system. When an autonomous vehicle does not include an anti-lock brake system, the deceleration of the autonomous vehicle as analyzed by tailgater awareness analysis module 740 may be a function of time and a brake reduction percentage, which is a percent difference in maximum longitudinal tire force at peak versus sliding friction, e.g., a function of a normal load on a tire. In one embodiment, a brake force reduction may be determined as a function of friction as well as a normal load on a tire.

In general, tailgater awareness analysis module 740 may apply a model based on substantially straight-line braking. Alternatively, tailgater awareness analysis module 740 may account for a steering of an autonomous vehicle to execute a failover trajectory, when applying a braking model. For example, to utilize full braking capabilities for an autonomous vehicle, tailgater awareness analysis module 740 may determine that as much longitudinal tire force as available may be used, while lateral tire force may be more limited. Lateral and longitudinal tire forces may be a function of a normal load and friction, as will be appreciated by those skilled in the art.

Tailgater awareness analysis module 740 may calculate a deceleration profile for an autonomous vehicle. Such a calculation may effectively assume a substantially constant acceleration kinematic motion, both for positive and negative accelerations, for both a tailgater and an autonomous vehicle. In one embodiment, a deceleration profile may account for a different deceleration value while a tailgater is not reacting and when a tailgater is reacting. Such a deceleration profile may include upper and lower bounds. Some examples of use of a deceleration profile are provided below with reference to FIGS. 8A and 8B.

The failover behavior module 750 selects a failover behavior and a failover plan to perform the selected failover behavior based on the analysis performed by the ODD analysis module 710, the pedestrian analysis module 720, the lead vehicle analysis module 730, and the tailgater awareness analysis module 740. The failover behavior module 750 communicates the failover plan to the processor 310 of FIG. 3 to cause the execution of the failover plan by the autonomous vehicle to perform the selected failover behavior.

Figure 8B:
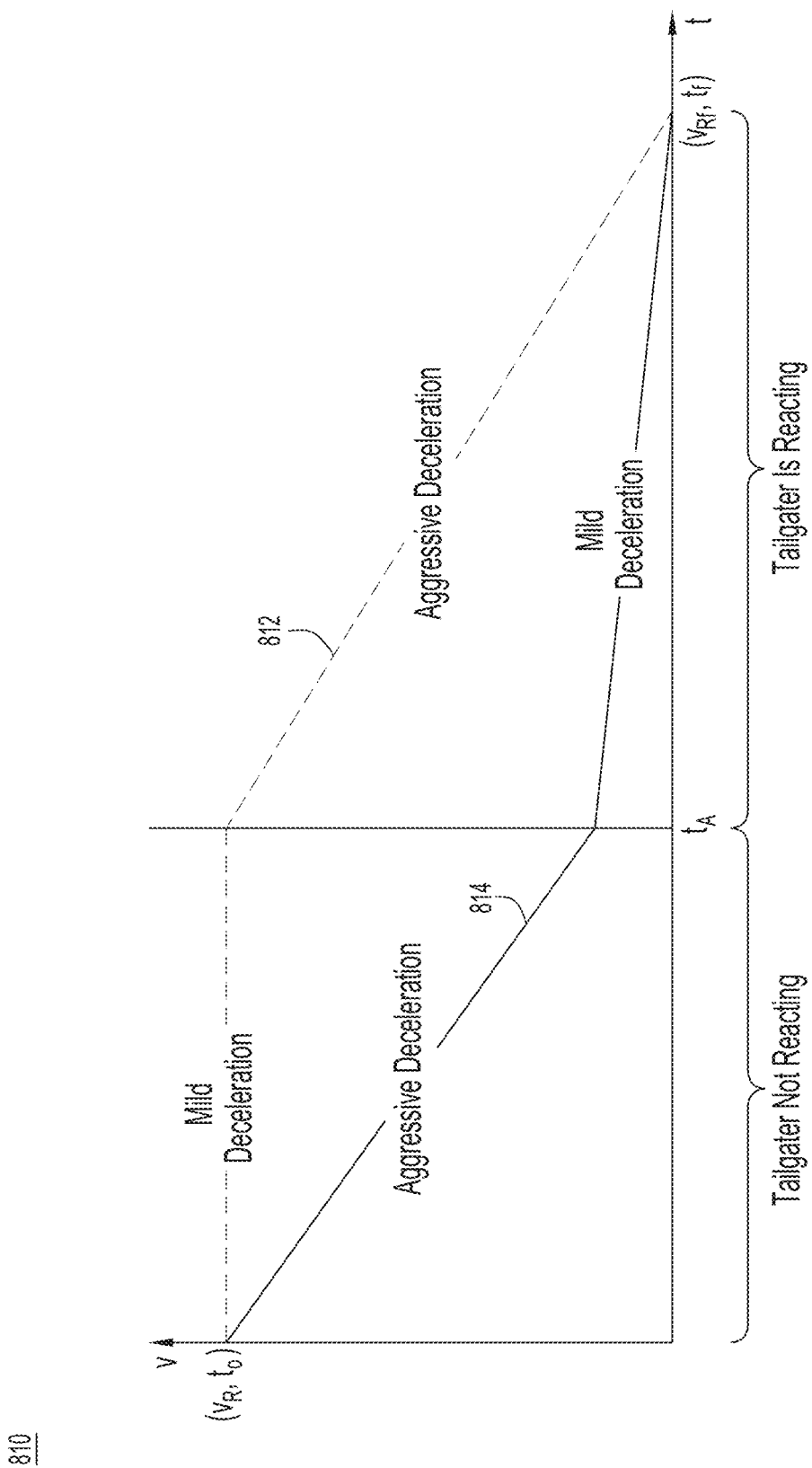

FIGS. 8A and 8B are diagrams illustrating failover plans 800 and failover plan boundaries 810 generated based on tailgater awareness, according to an example embodiment. The tailgater awareness analysis module 740 of FIG. 7 generates the failover plans 800 and/or the failover plan boundaries 810.

When environmental factors such as the ODD, pedestrians, and lead vehicles, allow for flexibility in performing the failover, the autonomous vehicle considers each tailgater detected and may brake sensibly based on awareness of tailgaters. Behavior of each detected tailgater is analyzed such as: whether the tailgater is accelerating, decelerating, or driving at a constant speed behind the autonomous vehicle, the separation distance between the vehicle and the tailgater, and the velocity of the autonomous vehicle or tailgater. A failover plan is selected from various candidate failover plans based on this analysis.

Examples depicted in FIGS. 8A and 8B are for the selected failover behavior of stopping the autonomous vehicle and the failover plan is a deceleration profile that is based on the analysis of tailgater's behavior, such as whether the tailgater is accelerating or deaccelerating with respect to the autonomous vehicle. The x-axis represents time and the y-axis represents the velocity of the autonomous vehicle. Time t0 represents the start of implementing the failover plan and time tF represents the time when the vehicle stopped (reaches a safe state). Time tA represent the time at which the tailgater starts reacting to the autonomous vehicle's deceleration. A numerically smaller velocity value at time tA depicted in FIGS. 8A and 8B illustrates a more aggressive deceleration while the tailgater may not be reacting. The slope of the line represents aggressiveness of deceleration with the steeper slope indicating a more aggressive braking.

The failover plans 800 include a first candidate profile 802, a second candidate profile 804, a third candidate profile 806, and a fourth candidate profile 808. The tailgater awareness analysis module 740 selects one of these candidate profiles based on the distance between the tailgater and the autonomous vehicle, velocity or speed of the tailgater and the autonomous vehicle, and any lateral movement (trajectory) of the autonomous vehicle. For example, if it is detected that the tailgater is accelerating, the tailgater awareness analysis module 740 may select the first candidate profile 802 or the second candidate profile 804. As another example, if the tailgater is more than x meters away from the autonomous vehicle and is decelerating, the fourth candidate profile 808 may be selected.

In one embodiment, for calculating the deceleration profiles, a constant acceleration kinematic motion (both in positive or negative accelerations) for both the tailgater and the autonomous vehicle may be assumed. When the autonomous vehicle comes to a complete stop, the tailgater should be at least x meters away, where $x=D_{AR,tf}$. The subscript "A" or "a" represents the agent such as a tailgater and the subscript "R" or "r" represents the autonomous vehicle (robot). Thus, $$Sa+D_{AR,tf}=Sr+D_{AR,t0},$$

where $D_{AR,t0}$ is the initial separation distance between the tailgater and the autonomous vehicle when the autonomous vehicle begins to decelerate and $D_{AR,tf}$ is the final distance when both vehicles are stopped. Sa is the distance traveled by the tailgater from time t0 to a stop tF and Sr is the distance traveled by the autonomous vehicle from time t0 to the stop tF. To maintain or achieve the distance x, the failover plans 800 are generated. The third candidate profile 806 may be represented as:

$$a_{R,nr} = a_{R,stop} = a_R = -\frac{v_{R,t_0}}{t_f}$$

where $\alpha_{R,nr}$ represents the deceleration of the autonomous vehicle from time t0 to tA and $\alpha_{R,stop}$ represents the deceleration of the autonomous vehicle from the time tA to tF (until a complete stop). tA is the time at which the tailgater starts reacting to the autonomous vehicle decelerating. tA is equal to the tailgater's perceived reaction time. The third candidate profile 806 represents a constant deceleration as is evident by the same slope of the line that represents the third candidate profile 806.

The first candidate profile 802 may be represented as:

$$a_{R,nr} < 0, \ a_{R,stop} < -\frac{v_{R,t_0}}{t_{stop}}, \text{ where } t_{stop} = t_f - t_A$$

$a_{R,nr}$ limit should be chosen as the autonomous vehicle's deceleration required to turn on the brake lights. Depending on how much deceleration is required, the second profile 804 or the fourth profile 808 are recommended. In one example embodiment, the autonomous vehicle requires any acceleration <0 m/s/s.

The second candidate profile 804 and the fourth candidate profile 808 may be derived as follows:

$$a_{R,nr} = \left(\frac{2}{t_A^2 + t_A t_{stop}}\right)\left[s_A + d_{AR,t_f} - d_{AR,t_0} - v_{R,t_0}\left(\frac{1}{2}t_{stop} + t_A\right)\right]$$

$$a_{R,stop} = -\frac{1}{t_{stop}}(v_{R,t_0} + a_{R,nr}t_A)$$

where Sa is the distance traveled by the tailgater from time t0 to tF.

According to another example, boundaries 810 for a failover plan (a deceleration profile) may be generated having an upper boundary 812 and a lower boundary 814. In this example, the upper boundary 812 corresponds to the first candidate profile 802 of FIG. 8A and the lower boundary 814 corresponds to the fourth candidate profile 808. These boundaries are provided to modulate a deceleration profile considering comfort of a human tailgater. Rate of deceleration or deceleration boundaries are set based on a value that represents a physical reaction time of an average human driver. In other words, the tailgater is not expected to react faster than a preset value and may not be expected to decelerate more aggressively than at a predetermined rate.

Figure 9:
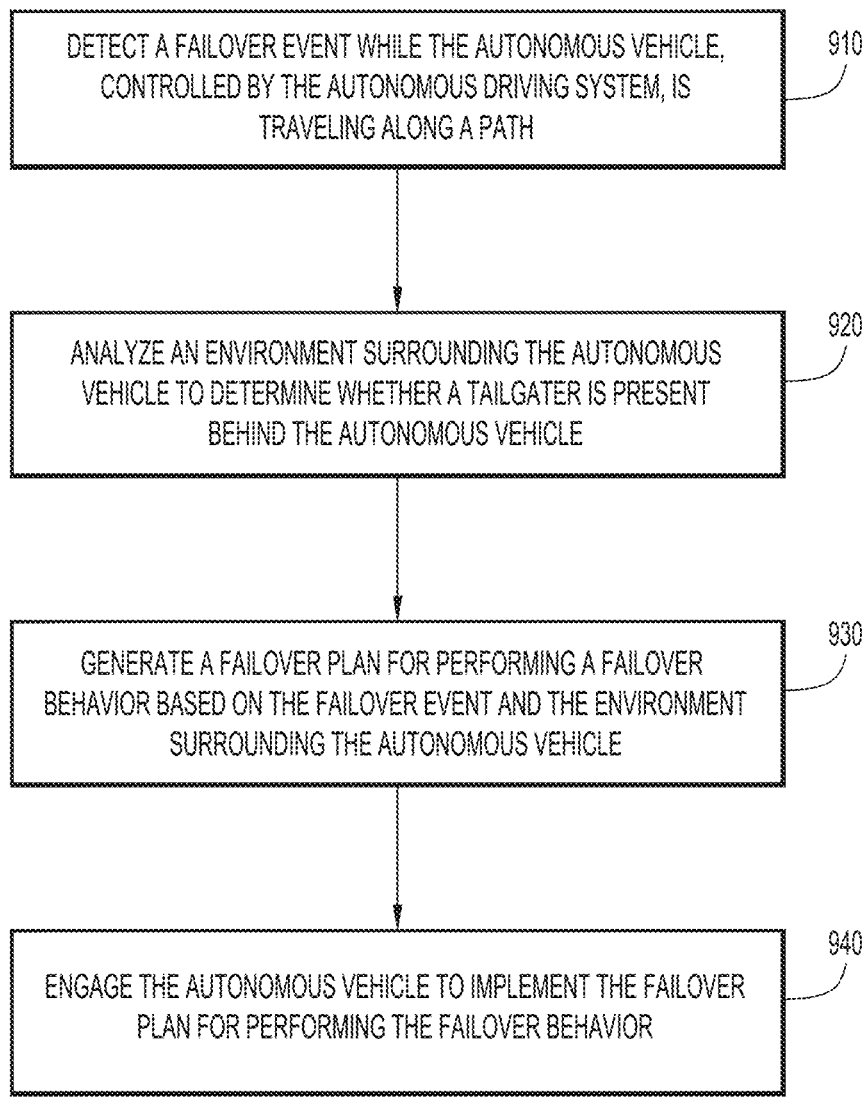
FIG. 9 is a flow chart depicting, at a high-level, operations of engaging an autonomous vehicle to implement a failover plan to perform a failover behavior, according to an example embodiment.

FIG. 9 is a flow chart depicting a method 900 of engaging an autonomous vehicle to implement a failover plan for performing a failover behavior, according to one example embodiment. The method 900 may be performed by the system components 300 of the autonomous vehicle 101 of FIGS. 2 and 3 such as the failover system 380.

The method 900 begins at 910, in which a failover event is detected while the autonomous vehicle, controlled by the autonomous driving system, is traveling along a path.

At 920, an environment surrounding the autonomous vehicle is analyzed to determine whether a tailgater is present behind the autonomous vehicle.

At 930, a failover plan is generated for performing a failover behavior based on the failover event and the environment surrounding the autonomous vehicle.

At 940, the failover system 380 in communication with the processor 310 and/or other components of the system components 300 engages the autonomous vehicle to implement the failover plan for performing the failover behavior.

In one or more example embodiments, the operation 930 of generating the failover plan for performing the failover behavior may include selecting the failover behavior from a plurality of failover behaviors, based on the failover event and generating the failover plan for performing the failover behavior based on the environment surrounding the autonomous vehicle.

In one instance, the failover event includes one or more of obstacles along the path including at least one of an intersection along the path, another vehicle in a dynamic region of interest (DRI) of the autonomous vehicle, a pedestrian in the DRI, or an object in the DRI. The operation of selecting the failover behavior may include selecting to stop the autonomous vehicle to avoid collision with the one or more obstacles.

In one form, the operation 920 of analyzing the environment surround the autonomous vehicle may include determining an operational design domain (ODD) that identifies whether an intersection is present along the path, detecting presence of one or more agents; and computing a first velocity of the tailgater determined to be present behind the autonomous vehicle and a second velocity of the autonomous vehicle.

In another form, the failover behavior is to stop the autonomous vehicle. The operation 930 of generating the failover plan for performing the failover behavior may include determining, based on the ODD, the presence of the one or more agents and the tailgater, a trajectory length defining a distance to be traveled by the autonomous vehicle before reaching a stopping location and a trajectory type defining how the autonomous vehicle is to proceed to the stopping location and generating a deceleration profile for the autonomous vehicle based on the ODD, the presence of the one or more agents and the tailgater, the first velocity, and the second velocity.

In one instance, generating the deceleration profile may include determining a rate of deceleration for the autonomous vehicle based on a value that represents physical reaction time of an average human driver and a behavior of the tailgater.

According to one or more example embodiments, the failover behavior is to stop the autonomous vehicle. The operation 930 of generating the failover plan for performing the failover behavior may include generating a plurality of deceleration profiles having variable deceleration rates and selecting a deceleration profile from the plurality of deceleration profiles based on a reaction of the tailgater to the autonomous vehicle beginning to implement the failover plan.

In the method 900, the failover behavior may be to stop the autonomous vehicle. The operation 930 of generating the failover plan for performing the failover behavior may then include generating a deceleration profile including an upper bound for decelerating the autonomous vehicle and a lower bound for decelerating the autonomous vehicle based on whether the tailgater is reacting to the autonomous vehicle being decelerated.

In yet another form, the failover event may be an intersection along the path. The operation 920 of analyzing the environment surrounding the autonomous vehicle may include determining whether the autonomous vehicle has a right-of-way at the intersection and analyzing the tailgater including a velocity of the tailgater and a distance between the tailgater and the autonomous vehicle, based on determining that the autonomous vehicle has the right-of-way at the intersection.

In one instance, the operation 930 of generating the failover plan for performing the failover behavior may include determining whether the autonomous vehicle can safely stop before the intersection based on analyzing the tailgater and generating the failover plan to cross the intersection without stopping based on determining that the autonomous vehicle cannot safely stop before the intersection.

Although only a few embodiments have been described in this disclosure, it should be understood that the disclosure may be embodied in many other specific forms without departing from the spirit or the scope of the present disclosure. By way of example, a failover system has generally been described as being included in an autonomous vehicle. In general, a failover system may include functionality that is onboard an autonomous vehicle as well as functionality that is remote from the autonomous vehicle. That is, a failover system may be distributed such that components on and off an autonomous vehicle may cooperate to determine failover behavior and apply situational awareness to the failover behavior.

A motion planner, which uses information provided by a failover system, may obtain upper and lower bounds of a proposed deceleration profile for an autonomous vehicle, and such bounds may differ depending on whether a tailgater is reacting or not reacting. The aggressiveness with which an autonomous vehicle may decelerate may be depending upon whether the tailgater is reacting.

The design or determination of a failover behavior or action may be dependent on factors such as a fault that causes the failover to effectively trigger. Alternatively, the failover behavior may be substantially agnostic to faults.

The methods and/or algorithms used to analyze tailgater behavior may vary. Suitable methods and/or algorithms may include any methods and/or algorithms that substantially model tailgater behavior by considering factors including, but not limited to including, a current velocity of the tailgater, the braking ability of the tailgater including the tailgater's braking jerk, the physical reaction time of a tailgater, a distance between the tailgater and an autonomous vehicle that the tailgater is following relatively closely, any acceleration of the tailgater before braking, jerking during braking by the autonomous vehicle, and/or a lateral acceleration limit of the autonomous vehicle.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner. It should be understood that deceleration profiles for vehicles which do not include tires in contact with the ground will generally not use a tire force consideration in the determination of a deceleration profile.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Figure 10:
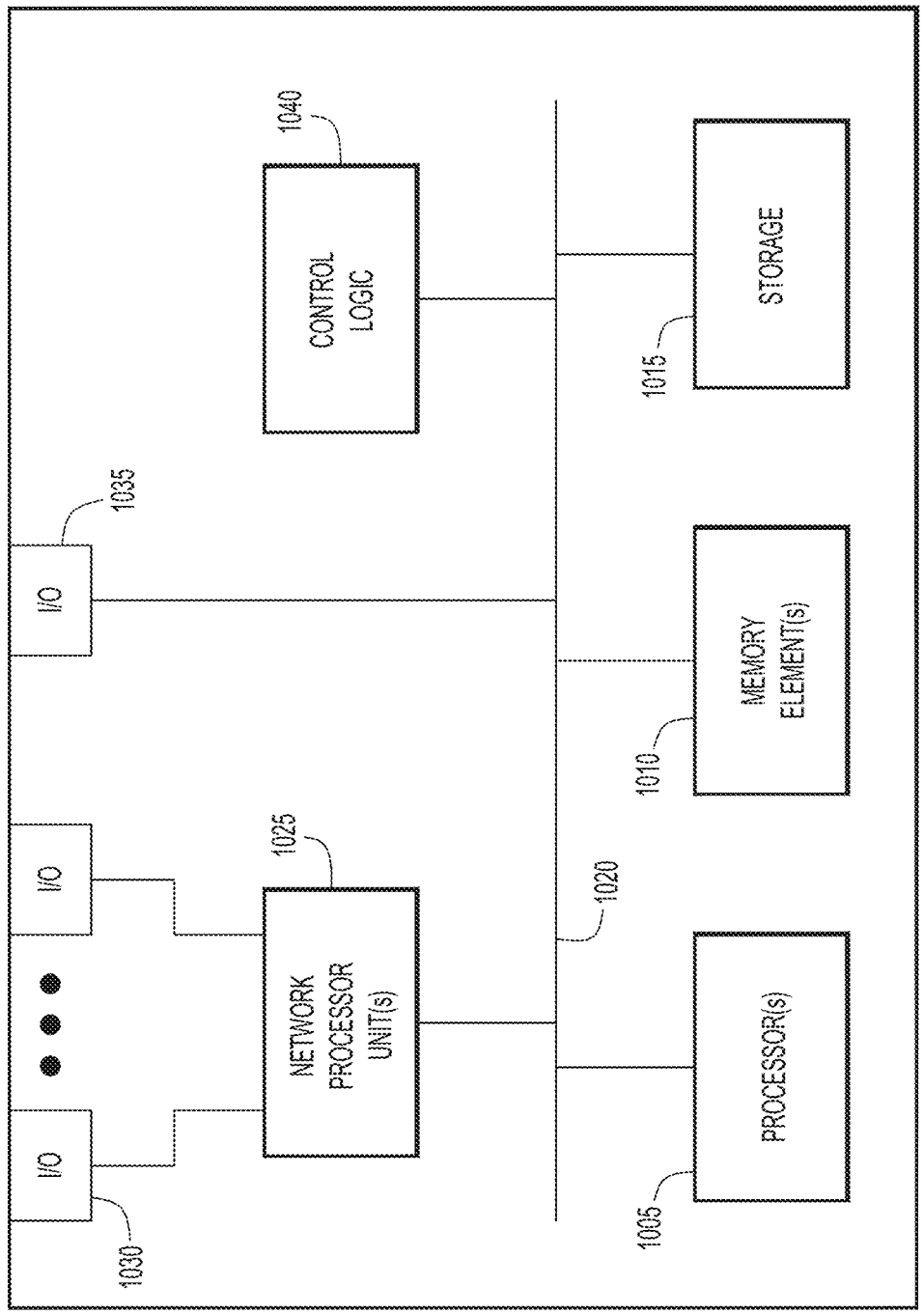
FIG. 10 is a block diagram of a computing device configured to perform functions associated with the techniques described herein, according to one or more example embodiments.

Referring now to FIG. 10, FIG. 10 illustrates a hardware block diagram of a computing device 1000 configured to perform functions associated with the techniques described herein and depicted in FIGS. 4-9, according to one or more example embodiments. The computing device 1000 may perform the functions of the failover system 380 of FIG. 3.

In at least one embodiment, computing device 1000 may include one or more processor(s) 1005, one or more memory element(s) 1010, storage 1015, a bus 1020, one or more network processor unit(s) 1025 interconnected with one or more network input/output (I/O) interface(s) 1030, one or more I/O interface(s) 1035, and control logic 1040. In various embodiments, instructions associated with logic for computing device 1000 can overlap in any manner and are not limited to the specific allocation of instructions and/or operations described herein.

In at least one embodiment, processor(s) 1005 is/are at least one hardware processor configured to execute various tasks, operations and/or functions for computing device 1000 as described herein according to software and/or instructions configured for computing device. Processor(s) 1005 (e.g., a hardware processor) can execute any type of instructions associated with data to achieve the operations detailed herein. In one example, processor(s) 1005 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1010 and/or storage 1015 is/are configured to store data, information, software, and/or instructions associated with computing device 1000, and/or logic configured for memory element(s) 1010 and/or storage 1015. For example, any logic described herein (e.g., control logic 1040) can, in various embodiments, be stored for computing device 1000 using any combination of memory element(s) 1010 and/or storage 1015. Note that in some embodiments, storage 1015 can be consolidated with memory element(s) 1010 (or vice versa), or can overlap/exist in any other suitable manner.

In at least one embodiment, bus 1020 can be configured as an interface that enables one or more elements of computing device 1000 to communicate in order to exchange information and/or data. Bus 1020 can be implemented with any architecture designed for passing control, data and/or information between processors, memory elements/storage, peripheral devices, and/or any other hardware and/or software components that may be configured for computing device 1000. In at least one embodiment, bus 1020 may be implemented as a fast kernel-hosted interconnect, potentially using shared memory between processes (e.g., logic), which can enable efficient communication paths between the processes.

In various embodiments, network processor unit(s) 1025 may enable communication between computing device 1000 and other systems, entities, etc., via network I/O interface(s) 1030 to facilitate operations discussed for various embodiments described herein. In various embodiments, network processor unit(s) 1025 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1030 can be configured as one or more Ethernet port(s), Fibre Channel ports, and/or any other I/O port(s) now known or hereafter developed. Thus, the network processor unit(s) 1025 and/or network I/O interfaces 1030 may include suitable interfaces for receiving, transmitting, and/or otherwise communicating data and/or information in a network environment.

I/O interface(s) 1035 allow for input and output of data and/or information with other entities that may be connected to the computing device 1000. For example, I/O interface(s) 1035 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1040 can include instructions that, when executed, cause processor(s) 1005 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1040) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1010 and/or storage 1015 can store data, software, code, instructions (e.g., processor instructions), logic, parameters, combinations thereof, and/or the like used for operations described herein. This includes memory element(s) 1010 and/or storage 1015 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in one form, an autonomous driving system of an autonomous vehicle is provided. The system includes a sensor system configured to sense an environment surrounding the autonomous vehicle and a controller, coupled to the sensor system, configured to control operation of the autonomous vehicle and to perform various operations. The operations include detecting a failover event while the autonomous vehicle is traveling along a path, analyzing the environment surrounding the autonomous vehicle to determine whether a tailgater is present behind the autonomous vehicle, generating a failover plan for performing a failover behavior based on the failover event and the environment surrounding the autonomous vehicle, and engaging the autonomous vehicle to implement the failover plan for performing the failover behavior.

In another form, one or more non-transitory computer readable storage media are provided encoded with instructions that, when executed by at least one processor, are operable to perform operations including detecting a failover event while the autonomous vehicle is traveling along a path, analyzing an environment surrounding the autonomous vehicle to determine whether a tailgater is present behind the autonomous vehicle, generating a failover plan for performing a failover behavior based on the failover event and the environment surrounding the autonomous vehicle, and engaging the autonomous vehicle to implement the failover plan for performing the failover behavior.

In yet another form, an apparatus or an autonomous vehicle is provided that includes the components, modules, and operations explained above with reference to FIGS. 1-10.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by an autonomous driving system of an autonomous vehicle, the method comprising:
   detecting a failover event while the autonomous vehicle, controlled by the autonomous driving system, is traveling along a path;
   analyzing an environment surrounding the autonomous vehicle to determine whether a tailgater is present behind the autonomous vehicle;
   generating a failover plan for performing a failover behavior based on the failover event and based on whether the tailgater is present behind the autonomous vehicle in the environment surrounding the autonomous vehicle; and
   engaging the autonomous vehicle to implement the failover plan for performing the failover behavior.

2. The method of claim 1, wherein generating the failover plan for performing the failover behavior includes:
   selecting the failover behavior from a plurality of failover behaviors, based on the failover event; and
   generating the failover plan for performing the failover behavior based on the environment surrounding the autonomous vehicle.

3. The method of claim 2, wherein the failover event includes one or more of obstacles along the path including at least one of an intersection along the path, another vehicle in a dynamic region of interest (DRI) of the autonomous vehicle, a pedestrian in the DRI, or an object in the DRI, and selecting the failover behavior includes:
   selecting to stop the autonomous vehicle to avoid collision with the one or more obstacles.

4. The method of claim 1, wherein analyzing the environment surrounding the autonomous vehicle includes:
   determining an operational design domain (ODD) that identifies whether an intersection is present along the path;
   detecting presence of one or more agents; and
   computing a first velocity of the tailgater determined to be present behind the autonomous vehicle and a second velocity of the autonomous vehicle.

5. The method of claim 4, wherein the failover behavior is to stop the autonomous vehicle and generating the failover plan for performing the failover behavior includes:
   determining, based on the ODD, the presence of the one or more agents and the tailgater, a trajectory length defining a distance to be traveled by the autonomous vehicle before reaching a stopping location and a trajectory type defining how the autonomous vehicle is to proceed to the stopping location; and generating a deceleration profile for the autonomous vehicle based on the ODD, the presence of the one or more agents and the tailgater, the first velocity, and the second velocity.

6. The method of claim 5, wherein generating the deceleration profile includes:
determining a rate of deceleration for the autonomous vehicle based on a value representing physical reaction time of an average human driver and a behavior of the tailgater.

7. The method of claim 1, wherein the failover behavior is to stop the autonomous vehicle and generating the failover plan for performing the failover behavior includes:
generating a plurality of deceleration profiles having variable deceleration rates; and
selecting a deceleration profile from the plurality of deceleration profiles based on a reaction of the tailgater to the autonomous vehicle beginning to implement the failover plan.

8. The method of claim 1, wherein the failover behavior is to stop the autonomous vehicle and generating the failover plan for performing the failover behavior includes:
generating a deceleration profile including an upper bound for decelerating the autonomous vehicle and a lower bound for decelerating the autonomous vehicle based on whether the tailgater is reacting to the autonomous vehicle being decelerated.

9. A method performed by an autonomous driving system of an autonomous vehicle, the method comprising:
detecting a failover event while the autonomous vehicle, controlled by the autonomous driving system, is traveling along a path;
analyzing an environment surrounding the autonomous vehicle to determine whether a tailgater is present behind the autonomous vehicle;
generating a failover plan for performing a failover behavior based on the failover event and the environment surrounding the autonomous vehicle; and
engaging the autonomous vehicle to implement the failover plan for performing the failover behavior,
wherein the failover event is an intersection along the path and analyzing the environment surrounding the autonomous vehicle includes:
determining whether the autonomous vehicle has a right-of-way at the intersection; and
analyzing the tailgater including a velocity of the tailgater and a distance between the tailgater and the autonomous vehicle, based on determining that the autonomous vehicle has the right-of-way at the intersection.

10. The method of claim 9, wherein generating the failover plan for performing the failover behavior includes:
determining whether the autonomous vehicle can safely stop before the intersection based on analyzing the tailgater; and
generating the failover plan to cross the intersection without stopping based on determining that the autonomous vehicle cannot safely stop before the intersection.

11. An autonomous driving system of an autonomous vehicle comprising:
a sensor system configured to sense an environment surrounding the autonomous vehicle; and
a controller coupled to the sensor system, configured to control operation of the autonomous vehicle and to perform operations comprising:
detecting a failover event while the autonomous vehicle is traveling along a path;
analyzing the environment surrounding the autonomous vehicle to determine whether a tailgater is present behind the autonomous vehicle;
generating a failover plan for performing a failover behavior based on the failover event and based on whether the tailgater is present behind the autonomous vehicle in the environment surrounding the autonomous vehicle; and
engaging the autonomous vehicle to implement the failover plan for performing the failover behavior.

12. The autonomous driving system of claim 11, wherein the controller is configured to perform the operation of generating the failover plan for performing the failover behavior by:
selecting the failover behavior from a plurality of failover behaviors, based on the failover event; and
generating the failover plan for performing the failover behavior based on the environment surrounding the autonomous vehicle.

13. The autonomous driving system of claim 12, wherein the failover event includes one or more of obstacles along the path including at least one of an intersection along the path, another vehicle in a dynamic region of interest (DRI) of the autonomous vehicle, a pedestrian in the DRI, or an object in the DRI, and the controller is configured to perform the operation of selecting the failover behavior by:
selecting to stop the autonomous vehicle to avoid collision with the one or more obstacles.

14. The autonomous driving system of claim 11, wherein the controller is configured to perform the operation of analyzing the environment surrounding the autonomous vehicle by:
determining an operational design domain (ODD) that identifies whether an intersection is present along the path;
detecting presence of one or more agents; and
computing a first velocity of the tailgater determined to be present behind the autonomous vehicle and a second velocity of the autonomous vehicle.

15. The autonomous driving system of claim 14, wherein the failover behavior is to stop the autonomous vehicle and the controller is configured to generate the failover plan for performing the failover behavior by:
determining, based on the ODD, the presence of the one or more agents and the tailgater, a trajectory length defining a distance to be traveled by the autonomous vehicle before reaching a stopping location and a trajectory type defining how the autonomous vehicle is to proceed to the stopping location; and
generating a deceleration profile for the autonomous vehicle based on the ODD, the presence of the one or more agents and the tailgater, the first velocity, and the second velocity.

16. The autonomous driving system of claim 15, wherein the controller is configured to generate the deceleration profile by:
determining a rate of deceleration for the autonomous vehicle based on a value representing a physical reaction time of an average human driver and a behavior of the tailgater.

17. The method of claim 1, wherein the failover plan is based on a profile of the tailgater determined to be present in the environment surrounding the autonomous vehicle.

18. The method of claim 9, wherein generating the failover plan for performing the failover behavior includes:
selecting the failover behavior from a plurality of failover behaviors, based on the failover event; and generating the failover plan for performing the failover behavior based on the environment surrounding the autonomous vehicle.

19. The method of claim 9, wherein the failover behavior is to stop the autonomous vehicle and generating the failover plan for performing the failover behavior includes:
generating a deceleration profile including an upper bound for decelerating the autonomous vehicle and a lower bound for decelerating the autonomous vehicle based on whether the tailgater is reacting to the autonomous vehicle being decelerated.

20. The method of claim 19, wherein generating the deceleration profile includes:
determining a rate of deceleration for the autonomous vehicle based on a value representing physical reaction time of an average human driver and a behavior of the tailgater.

\* \* \* \* \*